United States Patent
Lee et al.

(10) Patent No.: US 11,303,979 B2
(45) Date of Patent: Apr. 12, 2022

(54) ELECTRONIC DEVICE INCLUDING MULTI-CHANNEL SPEAKER SYSTEM

(71) Applicant: Samsung Electronics Co., Ltd., Suwon-si (KR)

(72) Inventors: Byounghee Lee, Suwon-si (KR); Chulmin Choi, Suwon-si (KR); Kiwon Kim, Suwon-si (KR); Seongkwan Yang, Suwon-si (KR); Kiwon Kim, Suwon-si (KR); Taeeon Kim, Suwon-si (KR); Joonrae Cho, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/998,535

(22) Filed: Aug. 20, 2020

(65) Prior Publication Data
US 2021/0058690 A1 Feb. 25, 2021

(30) Foreign Application Priority Data
Aug. 22, 2019 (KR) .................... 10-2019-0103042

(51) Int. Cl.
*H04R 1/02* (2006.01)
*H04R 1/28* (2006.01)
(Continued)

(52) U.S. Cl.
CPC .......... *H04R 1/026* (2013.01); *G06F 1/1688* (2013.01); *H04R 1/2826* (2013.01); *H04R 9/06* (2013.01)

(58) Field of Classification Search
CPC ........ H04R 1/026; H04R 1/2826; H04R 9/06; G06F 1/1688
(Continued)

(56) References Cited

U.S. PATENT DOCUMENTS

| 5,796,854 A | 8/1998 | Markow |
| 8,385,568 B2 | 2/2013 | Goel et al. |

(Continued)

FOREIGN PATENT DOCUMENTS

| KR | 10-2018-0024632 A | 3/2018 |
| KR | 10-2018-0062320 A | 6/2018 |

(Continued)

OTHER PUBLICATIONS

International Search Report dated Dec. 4, 2020, issued in the International Application No. PCT/KR2020/011120.
(Continued)

*Primary Examiner* — Sean H Nguyen
(74) *Attorney, Agent, or Firm* — Jefferson IP Law, LLP

(57) ABSTRACT

An electronic device is provided. The electronic device includes a multi-channel speaker system, and an electronic device according to an embodiment of the disclosure includes a housing, a display which is attached to the housing to be seen from the outside, an actuator which is attached to a back surface of the display to vibrate the display and to generate a sound of a first frequency band, a hole which is formed on one side surface of the housing, and a speaker which is positioned on a region adjacent to the hole to generate a sound of a second frequency band different from the first frequency band through the hole. The actuator includes a first actuator which is attached to a certain region of the back surface of the display to vibrate the display, and a second actuator which is attached to a back surface of the display spaced apart from the first actuator by a designated distance to vibrate the display.

19 Claims, 25 Drawing Sheets

(51) Int. Cl.
*H04R 9/06* (2006.01)
*G06F 1/16* (2006.01)

(58) Field of Classification Search
USPC .......................................................... 381/388
See application file for complete search history.

(56) References Cited

U.S. PATENT DOCUMENTS

| | | |
|---|---|---|
| 8,831,261 B2 | 9/2014 | Casebolt et al. |
| 10,966,009 B2 | 3/2021 | Lee et al. |
| 2013/0070947 A1 | 3/2013 | Chien et al. |
| 2013/0342806 A1 | 12/2013 | Sathe et al. |
| 2018/0269808 A1 | 9/2018 | Park et al. |
| 2020/0059544 A1 | 2/2020 | Hwang et al. |

FOREIGN PATENT DOCUMENTS

| | | |
|---|---|---|
| KR | 10-2018-0092155 A | 8/2018 |
| KR | 10-2018-0106473 A | 10/2018 |
| KR | 10-2019-0068936 A | 6/2019 |
| KR | 102312266 B1 | 10/2021 |

OTHER PUBLICATIONS

Written Opinion dated Dec. 4, 2020, issued in the International Application No. PCT/KR2020/011120.

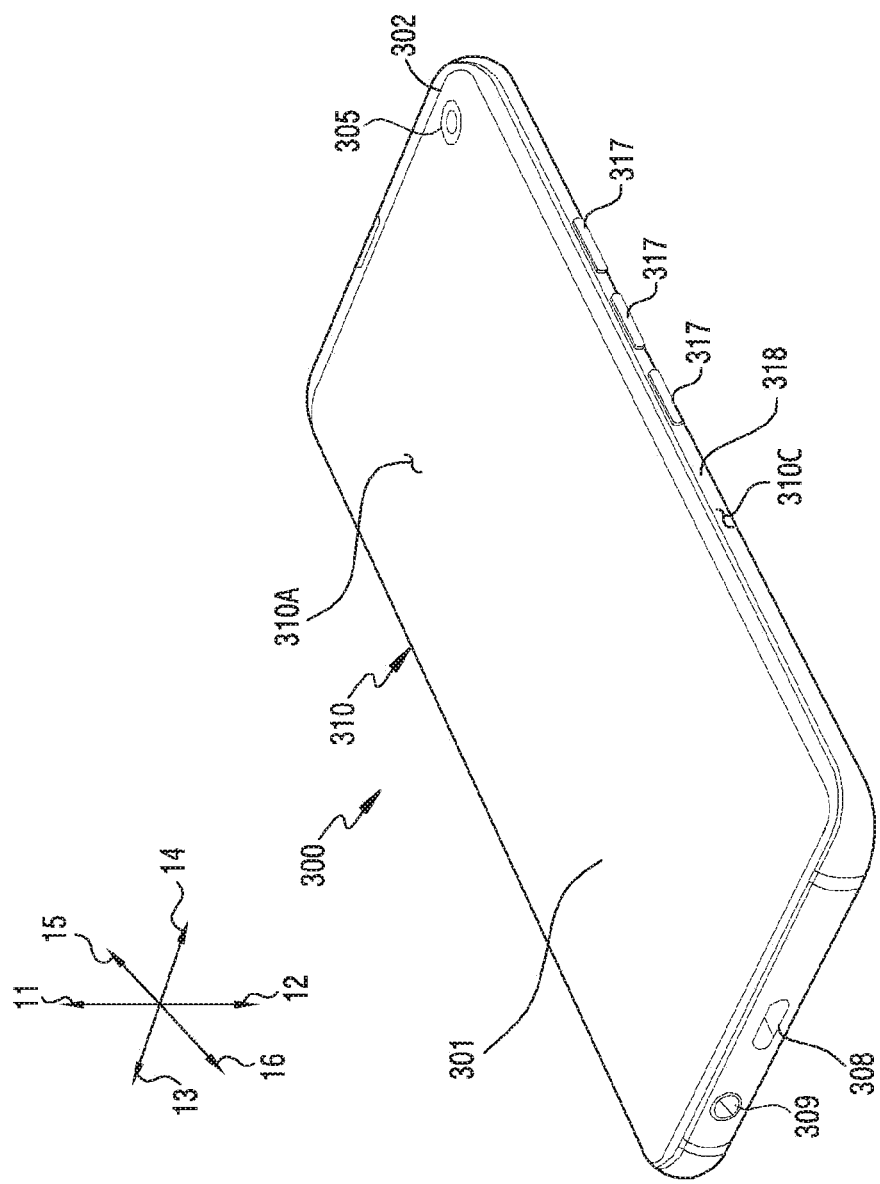

ELECTRONIC DEVICE INCLUDING MULTI-CHANNEL SPEAKER SYSTEM

CROSS-REFERENCE TO RELATED APPLICATION(S)

This application is based on and claims priority under 35 U.S.C. § 119(a) of a Korean patent application number 10-2019-0103042, filed on Aug. 22, 2019, in the Korean Intellectual Property Office, the disclosure of which is incorporated by reference herein in its entirety.

BACKGROUND

1. Field

The disclosure relates to an electronic device including a multi-channel speaker system.

2. Description of Related Art

As electronic devices (e.g., mobile devices) are increasingly used as a means for enjoying music and videos beyond their basic function of communicating, users of electronic devices are demanding an electronic device equipped with a speaker system of higher sound quality.

Accordingly, an electronic device having a multi-channel (e.g., 2.1 channel) speaker system implemented therein emerges. However, a related-art mobile device provided with a multi-channel speaker system implements the multi-channel speaker system by utilizing a speaker, and thus has no choice but to have a separate speaker hole for emitting a sound.

Since a speaker hole may degrade the aesthetics of an electronic device and may degrade waterproof performance of the electronic device, an effort has been made to minimize the speaker hole formed on the electronic device. As a result, a method for applying sound on display (SOD) technology for generating a sound through a vibration of a panel by mounting a vibration actuator has recently been suggested.

The above information is presented as background information only to assist with an understanding of the disclosure. No determination has been made, and no assertion is made, as to whether any of the above might be applicable as prior art with regard to the disclosure.

SUMMARY

When a vibration actuator is used, there is no problem in generating a sound of a high frequency band, but performance of generating a sound of a low-frequency band may deteriorate in comparison to a normal speaker, due to characteristics of the vibration actuator.

To this end, a separate speaker is required to generate a sound of a low frequency band even if SOD technology is used, and as a result, there is a disadvantage that a speaker hole is necessary to implement a multi-channel speaker system even if SOD technology is applied to the electronic device.

Aspects of the disclosure are to address at least the above-mentioned problems and/or disadvantages and to provide at least the advantages described below. Accordingly, an aspect of the disclosure is to provide an electronic device, which can implement a multi-channel speaker system without a separate speaker hole by emitting a sound generated in a speaker to the outside of the electronic device by using a hole which is formed for other functions (e.g., USB connection or earphone connection), rather than a speaker hole, or by using an assembly gap which is formed between components of the electronic device.

Additional aspects will be set forth in part in the description which follows and, in part, will be apparent from the description, or may be learned by practice of the presented embodiments.

Another aspect of the disclosure aims at implementing a holeless structure of an electronic device by providing an electronic device which can implement a multi-channel speaker system by using a plurality of vibration actuators according to another embodiment.

In accordance with an aspect of the disclosure, an electronic device is provided. The electronic device includes a housing, a display which is attached to the housing to be seen from the outside, an actuator which is attached to a back surface of the display to vibrate the display and to generate a sound of a first frequency band, a hole which is formed on one side surface of the housing, and a speaker which is positioned on a region adjacent to the hole to generate a sound of a second frequency band different from the first frequency band through the hole, wherein the actuator includes a first actuator which is attached to a certain region of the back surface of the display to vibrate the display, and a second actuator which is attached to a back surface of the display spaced apart from the first actuator by a designated distance to vibrate the display.

In accordance with another aspect of the disclosure, an electronic device is provided. The electronic device includes a housing including a first region in which at least one air vent hole is formed, a display which is attached to the housing to be seen from the outside, an actuator which is attached to a back surface of the display to vibrate the display and to generate a sound of a first frequency band, and a speaker which is positioned in the first region to generate a sound of a second frequency band which is lower than the first frequency band through the at least one air vent hole, wherein the actuator includes a first actuator which is attached to a certain region of a back surface of the display to vibrate the display, and a second actuator which is attached to a back surface of the display spaced apart from the first actuator by a designated distance to vibrate the display.

In accordance with another aspect of the disclosure, an electronic device is provided. The electronic device includes a housing including a first surface facing in a first direction, a second surface facing in a second direction opposite to the first direction, and a side surface extended along borders of the first surface and the second surface to form an inner space, a display which is seen from an outside through the first surface of the housing, a first actuator which is attached to a back surface of an upper end of the display to vibrate the display and to generate a sound of a first frequency band, a second actuator which is attached to a back surface of a lower end of the display to vibrate the display and to generate the sound of the first frequency band, and a third actuator which is attached to the second surface of the housing to vibrate the second surface of the housing and to generate a sound of a second frequency band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A is a perspective view illustrating an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
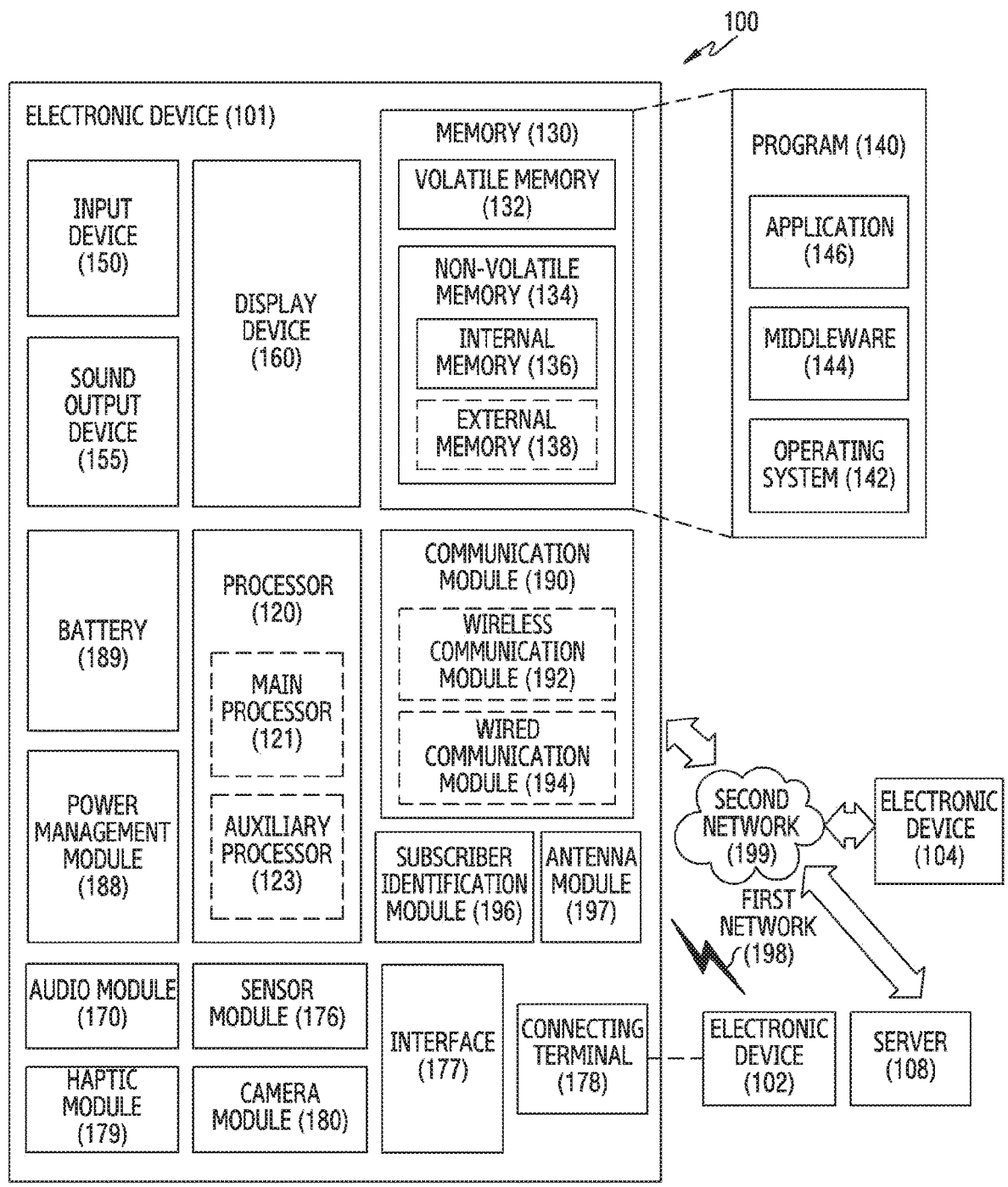
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the present disclosure, at least one (e.g., the display device 160 or the camera module 180) of the components may be omitted from the electronic device 101, or one or more other components may be added in the electronic device 101. In some embodiments of the present disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thererto. The memory 130 may include the volatile memory 132 or the non-volatile memory 134, as well as internal memory 136 and external memory 138.

The program 140 may be stored in the memory 130 as software, and may include an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the present disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the present disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2B:
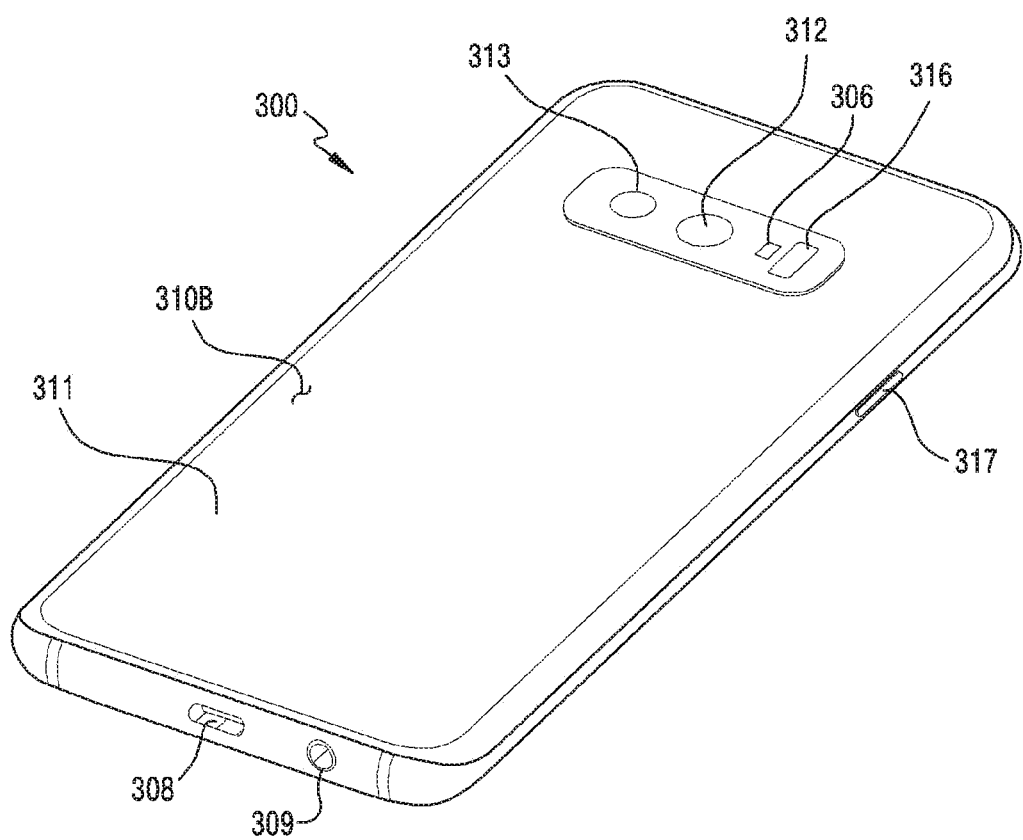
FIG. 2B is a perspective view of the electronic device of FIG. 2A when viewed from back according to an embodiment of the disclosure.

FIG. 2A is a perspective view illustrating an electronic device according to an embodiment of the disclosure. FIG. 2B is a perspective of the electronic device of FIG. 2A when viewed from the back according to an embodiment of the disclosure.

Referring to FIGS. 2A and 2B, the electronic device 300 according to various embodiments may include a housing 310 which includes: a first surface (or a front surface) 310A facing in a first direction 11; a second surface (or a rear surface) 310B facing in a second direction 12 opposite to the first direction 11; and a side surface (or a sidewall) 310C surrounding a space between the first surface 310A and the second surface 310B. In another embodiment of the disclosure (not shown), the housing 310 may refer to a structure that forms some of the first surface 310A, the second surface 310B and the side surface 310C of FIGS. 2A and 2B.

The first surface 310A may be formed by a front plate 302 (e.g., a glass plate including various coating layers, or a polymer plate) at least a portion of which is substantially transparent. According to an embodiment, the front plate 302 may include a curved portion that is bent from the first surface 310A toward a rear plate 311 and is seamlessly extended.

The second surface 310B may be formed by the rear plate 311 which is substantially opaque. The rear plate 311 may be formed with, for example, coated or colored glass, ceramic, polymer, metal (e.g., aluminum, stainless steel (STS), or magnesium), or a combination of at least two of the above-mentioned materials. The rear plate 311 may include a curved portion that is bent from the second surface 310B toward the front plate 302 and is seamlessly extended.

The side surface 310C may be formed by a side bezel structure (or a side member or a sidewall) 318 which is coupled with the front plate 302 and the rear plate 311, and includes metal and/or polymer. The rear plate 311 and the side bezel structure 318 may be integrally formed with each other, and may include the same material (e.g., a metallic material such as aluminum).

The electronic device 300 may include at least one of a display 301, an audio module, a sensor module, a camera module 305, a key input device 317, and a connector hole 308, 309. In a certain embodiment, the electronic device 300 may omit at least one (e.g., the key input device 317) of the components or may additionally include other components.

For example, the electronic device 300 may include a sensor module (not shown). A sensor such as a proximity sensor or an illuminance sensor may be integrated into the display 301 within a region provided by the front plate 302, or may be disposed on a position adjacent to the display 301.

The electronic device 300 may further include a light emitting element, and the light emitting element may be disposed on a position adjacent to the display 301 within a region provided by the front plate 302. The light emitting element may provide state information of the electronic device 300 in the form of light, for example. The light emitting element may provide, for example, a light source operating in association with the camera module 305. The light emitting element may include, for example, a light emitting diode (LED), an infrared ray LED (IR LED), and a xenon lamp.

The display 301 may be seen from the outside of the electronic device 300 through a substantial portion of the front plate 302. In a certain embodiment, an edge of the display 301 may be formed substantially the same as a border shape (e.g., a curved surface) of the front plate 302 that is adjacent to the display. In another embodiment (not shown), a gap between the border of the display 301 and the border of the front plate 302 may be formed substantially the same to extend a shown area of the display 301. In another embodiment of the disclosure (not shown), a recess or an opening may be formed on a portion of a screen display region of the display 301, and the electronic device 300 may include other electronic components aligned with the recess or the opening, for example, the camera module 305, a proximity sensor or an illuminance sensor which is not shown.

In another embodiment of the disclosure, at least one of the camera module 312, 313, a fingerprint sensor 306, and a flash 316 may be included on a back surface of the screen display region of the display 301. In another embodiment of the disclosure (not shown), the display 301 may be coupled with or disposed adjacent to a touch detection circuitry, a pressure sensor for measuring a strength (pressure) of a touch, and/or a digitizer for detecting a stylus pen of a magnetic field method.

The audio module may include a microphone hole and a speaker hole. The microphone hole may have a microphone disposed therein to acquire an external sound. The microphone hole may have a plurality of microphones disposed therein to detect a direction of a sound. The speaker hole and the microphone hole may be implemented as one hole, or only a speaker may be included without a separate speaker hole (e.g., a piezo speaker).

The electronic device 300 may include the sensor module (not shown), thereby generating an electric signal or a data value corresponding to an internal operation state or an external environment state. The sensor module may further include a proximity sensor disposed on the first surface 310A of the housing 310, a fingerprint sensor integrated into or disposed adjacent to the display 301, and/or a biometric sensor (e.g., a heart rate monitor (HRM) sensor) disposed on the second surface 310B of the housing 310. The electronic device 300 may further include the sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 305, 312, 313, 306 may include a first camera device 305 disposed on the first surface 310A of the electronic device 300, a second camera device 312, 313 disposed on the second surface 310B, and/or the flash 306. The camera devices 305, 312, 313 may include one lens or a plurality of lenses, an image sensor, and/or an image signal processor. The flash 306 may include, for example, a light emitting diode or a xenon lamp. Two or more lenses (an infrared camera, a wide angle lens and a telephoto lens) and image sensors may be disposed on one surface of the electronic device 300.

The key input device 317 may be disposed on the side surface 310C of the housing 310. In another embodiment of the disclosure, the electronic device 300 may omit a portion or an entirety of the above-mentioned key input device 317, and the key input device 317 that is not included may be implemented on the display 301 in other forms such as a soft key. The key input device may include at least a portion of the fingerprint sensor 316 disposed on the second surface 310B of the housing 310.

The connector hole 308, 309 may include a first connector hole 308 to accommodate a connector (e.g., a USB connector) for exchanging power and/or data with an external electronic device, and/or a second connector hole (e.g., an earphone jack) 309 to accommodate a connector for exchanging an audio signal with an external electronic device. In a certain embodiment of the disclosure (not shown), the first connector hole 308 and the second connector hole 309 may be implemented as one hole. The electronic device 300 may exchange power and/or data with an external electronic device, or may exchange an audio signal, without the first connector hole 308 and the second connector hole 309, which will be described in detail below.

Figure 3A:
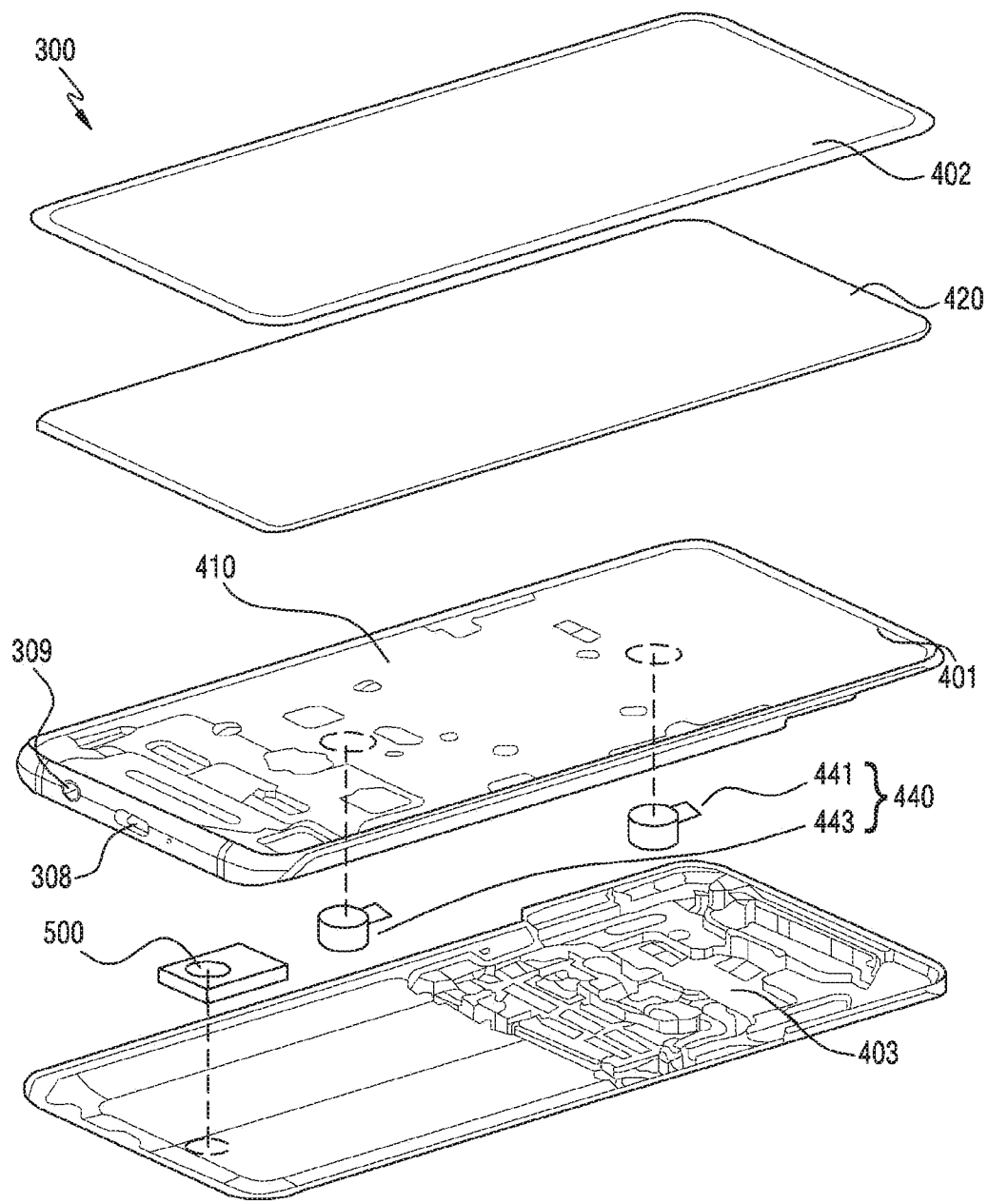
FIG. 3A is an exploded perspective view of an electronic device according to an embodiment of the disclosure.
Figure 3B:
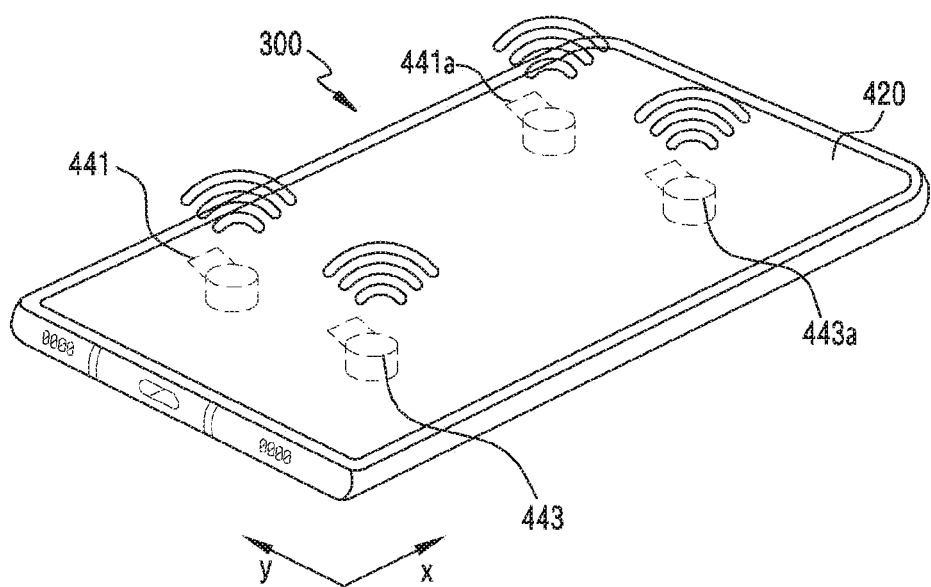
FIG. 3B is a perspective view illustrating a state in which a plurality of vibration actuators are mounted inside the electronic device according to an embodiment of the disclosure.

FIG. 3A is an exploded perspective view of an electronic device according to an embodiment of the disclosure. FIG. 3B is a perspective view illustrating a state in which a plurality of vibration actuators 441, 441a, 443, 443a are mounted inside the electronic device 300 according to an embodiment of the disclosure.

Referring to FIG. 3A, the electronic device 300 may include a housing 401 (e.g., the housing 310 of FIG. 2A), a transparent plate 402 (e.g., the front plate 302 of FIG. 2A), a rear plate 403 (e.g., the rear plate 311 of FIG. 2B), a support member 410, a display 420 (e.g., the display 301 of FIG. 2A), a vibration actuator 440, and a speaker 500. At least one of the components of the electronic device 300 may be the same as or similar to at least one of the components of the electronic device 300 of FIG. 2A or 2B, and a redundant explanation is omitted.

The housing 401 may include a first surface (e.g., the front surface 310A of FIG. 2A) of the electronic device 300, a second surface (e.g., the rear surface 310B of FIG. 2B), and a side surface (e.g., the side surface 310C of FIG. 2B) extended along borders of the first surface and the second surface to surround an inner space of the electronic device 300.

The transparent plate 402 may form the first surface of the electronic device 300. A border of the transparent plate 402 may be connected in contact with a portion of the side surface (or sidewall) of the housing 401. The transparent plate 402 may be formed with a transparent polymer material (e.g., polyimide (PI), polyethylene terephthalate (PET)) or a glass material, and the transparent polymer or glass material may be merely an example of a material for forming the transparent plate 402, and the material of the transparent plate 402 is not limited thereto.

The rear plate 403 may form the second surface of the electronic device 300. A border of the rear plate 403 may be connected in contact with a portion of the side surface (or sidewall) of the housing 401. In another example, the rear plate 403 may be integrally formed with the side surface of the housing 401.

The support member 410 may support electronic components (e.g., a camera, a printed circuit board (PCB) or the vibration actuator 440) disposed inside the electronic device 300. The support member 410 may be extended from the side surface of the housing 401 toward the inner space of the electronic device 300. The support member 410 may be integrally formed with the side surface of the housing 401, or may be separated from the side surface of the housing 401 and may be disposed inside the housing 401.

At least a portion of the support member 410 may support the transparent plate 402 in contact with the transparent plate 402, and may be formed to surround the display 420, which will be described below. The support member 410 may be disposed or formed, spaced apart from the display 420, such that a gap 405 is formed between the support member 410 and the display 420.

The display 420 may be formed with a plurality of layers, and may be disposed between the transparent plate 402 and the support member 410. For example, the display 420 may include a thin film transistor (TFT) layer, an electrode layer, an organic material layer, or a pixel layer.

The display 420 may have at least a portion seen from the outside of the electronic device 300 through the transparent plate 402. Specifically, the display 420 may emit light from a pixel to transmit information to a user, and the emitted light may be transmitted to the outside through the transparent plate 402.

The display 420 may include a display panel (not shown) or a touch panel (not shown), and the touch panel may be disposed on a cell of the display panel. The display 420 may be coupled with or may be disposed adjacent to some of a touch detection circuitry connected with the touch panel to detect a touch, a pressure sensor for measuring a strength (pressure) of a touch, or a digitizer for detecting a stylus pen of a magnetic field method.

The vibration actuator 440 may be configured to convert an electric signal into a mechanical signal, and for example, may generate a vibration (mechanical signal) through an electric signal including acoustic information.

The vibration generated at the vibration actuator 440 may be transmitted to instruments (e.g., the support member 410, the display 420, or the transparent plate 402) of the electronic device 300, thereby generating an acoustic signal. For example, the vibration generated at the vibration actuator 440 may be transmitted to the display 420. The display 420 may operate as a vibration plate of a speaker, thereby generating a sound through the vibration generated at the vibration actuator 440. The vibration actuator 440 may not only generate a sound through the generated vibration, but may also implement a haptic function.

The vibration actuator 440 may be attached to a back surface (or rear surface) of the support member 410 to generate a vibration, and may be attached to a back surface of the display 420 through an opening formed on the support member 410 to generate a vibration. The vibration actuator 440 may be attached to the back surface of the support member 410 or the back surface of the display 420 through an adhesive member, and the adhesive member may include, for example, a double-sided adhesive film, a pressure sensitive adhesive (PSA).

The vibration actuator 440 may include a first actuator 441 and a second actuator 443. The first actuator 441, the second actuator 443 may be attached to a back surface of the support member 410 or a back surface of the display 420 to generate a vibration and to generate a sound, as will be described below, and the electronic device 300 may implement a two-channel speaker system through the sound generated at the first actuator 441 and the sound generated at the second actuator 443. According to various embodiments of the disclosure, the vibration actuator 440 may include an additional actuator (not shown) in addition to the first actuator 441, the second actuator 443, thereby implementing a multi-channel speaker system. The vibration actuator 440 may be a voice coil motor or a piezoelectric actuator, but is not limited thereto.

The electronic device 300 may include the speaker 500 to generate a sound of a low frequency band. When a sound is generated through the vibration actuator 440, there is no problem in generating a sound of a high frequency band, but the vibration actuator 440 does not have a good frequency characteristic of a low frequency band, and may have a limit on generating a sound of a low frequency band. The electronic device 300 may generate a sound of a high frequency band through the vibration actuator 440, and may generate a sound of a low frequency band through the speaker 500, not through the vibration actuator 440. The electronic device 300 may implement one channel, two-channel, . . . , N-channel (N is a natural number) through the vibration actuator 440, and may implement 0.1 channel through the speaker 500, such that an N.1 (N is a natural number) channel speaker system can be implemented consequently. The speaker 500 may be a dynamic speaker formed with a vibration plate, a magnet, a coil, etc., but is not limited thereto.

Referring to FIG. 3B, the electronic device 300 may include a first actuator 441, a second actuator 443, a third actuator 441a, and a fourth actuator 443a which are attached to a back surface of the display 420. For example, the first actuator 441 may be attached to a certain region of the back surface of the display 420, and the second actuator 443 may be attached to a back surface of the display 420 spaced apart from the first actuator 441 by a designated distance in a vertical direction (e.g., a y-direction of FIG. 3B). The third actuator 441a may be attached to a back surface of the display 420 spaced apart from the first actuator 441 by a designated distance in a horizontal direction (e.g., an x-direction of FIG. 3B), and the fourth actuator 443a may be attached to a back surface of the display 420 spaced apart from the third actuator 441a by a designated distance in the vertical direction (e.g., the y-direction of FIG. 3B). The first actuator 441, the second actuator 443, the third actuator 441a, and the fourth actuator 443a may be attached to the back surface of the display 420 to form a rectangular shape. However, the attachment positions of the first actuator 441, the second actuator 443, the third actuator 441a, and the fourth actuator 443a are not limited to thereto. The first actuator 441, the second actuator 443, the third actuator 441a, and the fourth actuator 443a may be attached to the back surface of the display 420 to form a trapezoidal shape.

According to an embodiment of the disclosure, a first stereo may be implemented through sounds generated by the first actuator 441 and the second actuator 443 which is spaced apart from the first actuator 441 in the vertical direction. In addition, a second stereo may be implemented through sounds generated by the third actuator 441a and the fourth actuator 443a which is spaced apart from the third actuator 441a in the vertical direction. A third stereo may be implemented by sounds generated by the first actuator 441 and the third actuator 441a which is spaced apart from the first actuator 441 in the horizontal direction, and a fourth stereo may be implemented by sounds generated by the second actuator 443 and the fourth actuator 443a which is spaced apart from the second actuator 443 in the horizontal direction. The electronic device 300 may implement a stereo by operating the first actuator 441 and the second actuator 443, and may implement a stereo by operating the first actuator 441 and the third actuator 441a. The electronic device 300 may implement a stereo by operating the third actuator 441a and the fourth actuator 443a, and may implement a stereo by operating the second actuator 443 and the fourth actuator 443a.

The electronic device 300 may implement 0.1 channel by further including a speaker (e.g., the speaker 500 of FIG. 3A). Although not illustrated in FIG. 3B, this is the same as described above and a detailed description thereof is omitted.

When a sound is generated to the outside of the electronic device 300 through the speaker 500, a separate hole (e.g., a speaker hole) is required to emit the sound generated in the speaker 500 to the outside, and thus it is common that the speaker 500 is positioned in the proximity of the speaker hole. The electronic device 300 may have the speaker 500 disposed on a region adjacent to a hole formed for other purposes (e.g., a USB connector or an earphone jack), rather than in a speaker hole, and may emit a sound generated in the speaker 500 to the outside through the hole formed for other purposes, not through a speaker hole.

The electronic device 300 according to another embodiment of the disclosure may have the speaker 500 disposed on a region adjacent to an assembly gap between components, and may emit a sound generated in the speaker 500 to the outside through the assembly gap, although this is not illustrated.

For example, the speaker 500 may be disposed on a region adjacent to an assembly gap between the support member 410 and the transparent plate 402 or an assembly gap between the support member 410 and the rear plate 403. In this case, the assembly gap may be a rectangular recess having a width of 0.2 mm or less, but is not limited thereto. The electronic device 300 according to another embodiment may have the speaker 500 disposed on a region adjacent to an air vent hole, and may emit a sound generated in the speaker 500 to the outside of the electronic device 300 through the air vent hole, and a detailed description thereof will be provided below.

A hole (e.g., a speaker hole) of a predetermined size or larger is essential to emit sounds when sounds of all frequency bands are generated through the speaker 500. However, since the electronic device 300 according to various embodiments of the disclosure uses the speaker 500 to generate a sound of a low frequency band, not all frequency bands, a sound can be emitted to the outside of the electronic device 300 through a hole formed for other purposes, an assembly gap between components, and/or an air vent hole, not through a speaker hole.

The electronic device 300 according to various embodiments of the disclosure can emit a sound to the outside of the electronic device 300 without requiring a separate speaker hole, by changing the position of the speaker 500. A detailed description of this is provided below.

Figure 4:
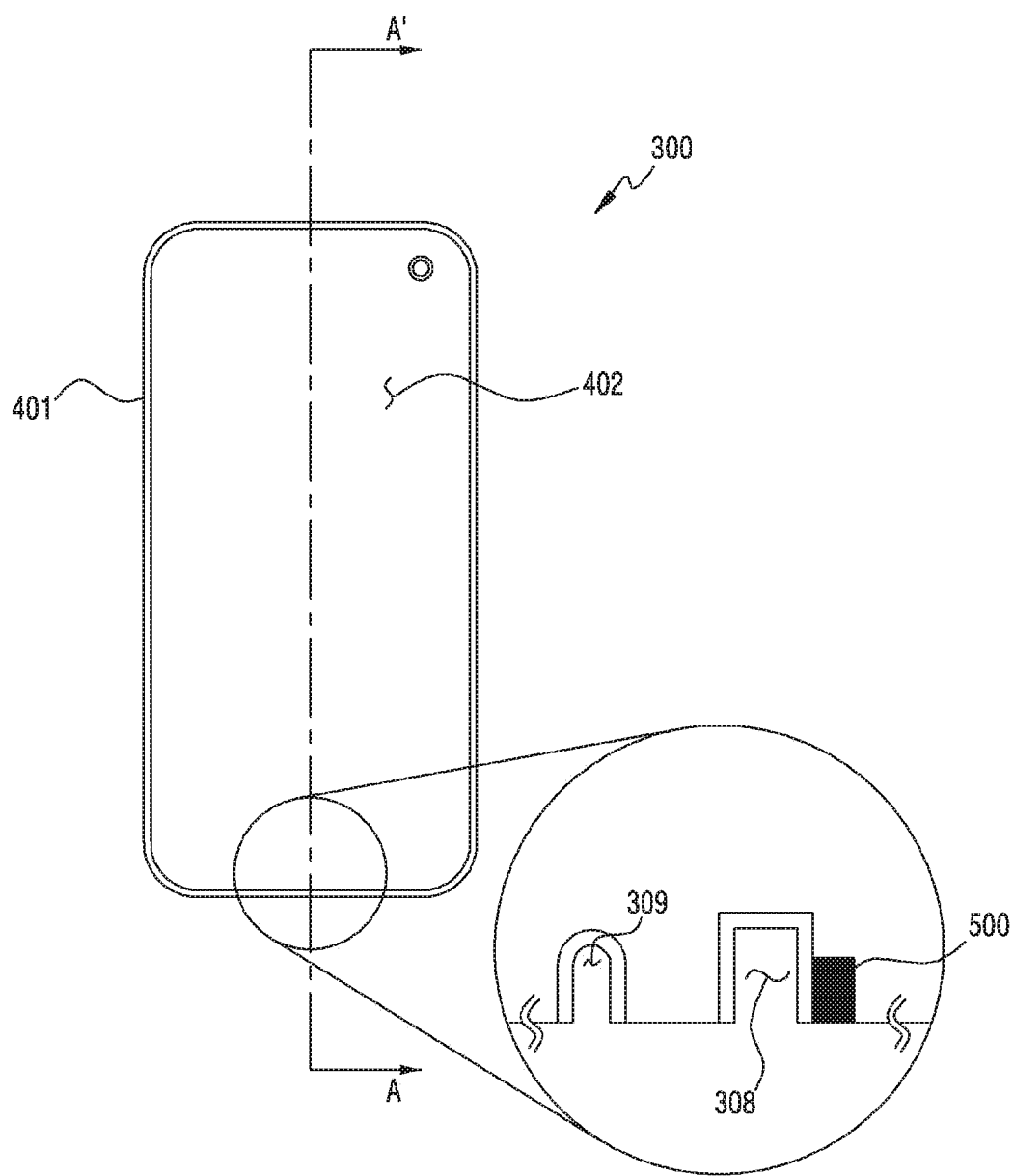
FIG. 4 is a view illustrating components disposed inside a front surface of an electronic device and some regions of the electronic device according to an embodiment of the disclosure.
Figure 5A:
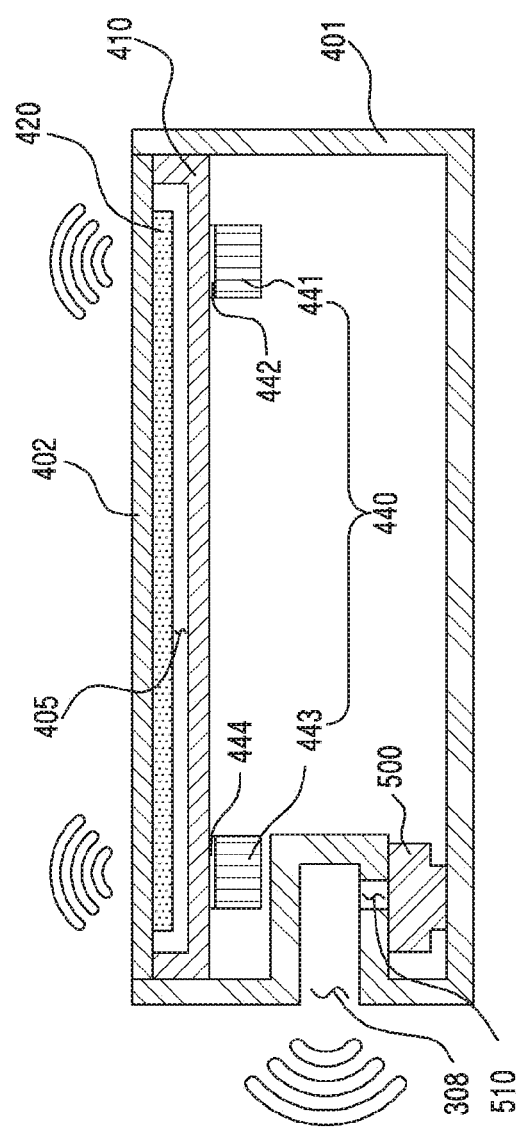
FIG. 5A is a cross-sectional view of the electronic device of FIG. 4 taken on line A-A' according to an embodiment of the disclosure.
Figure 5B:
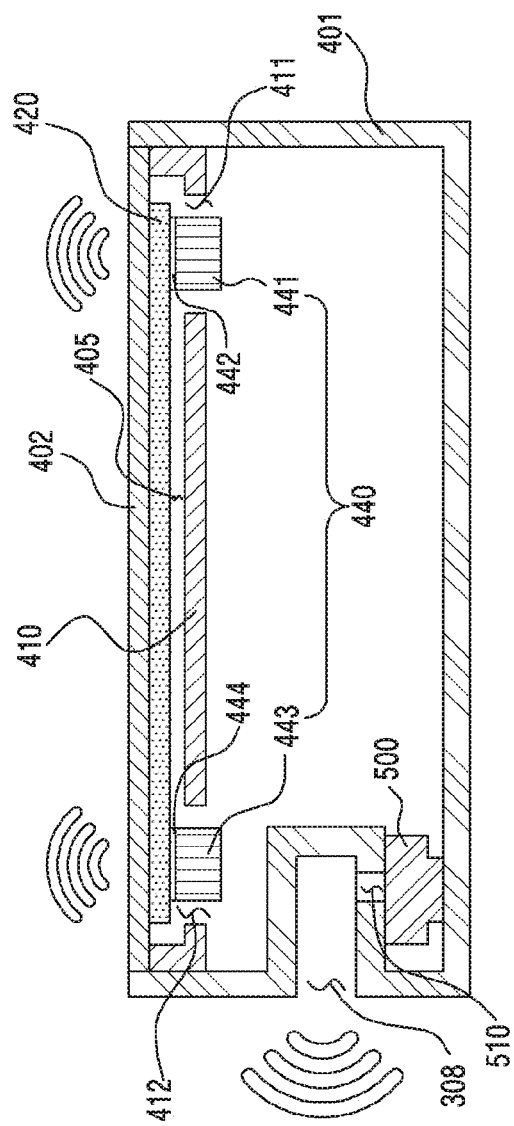
FIG. 5B is a cross-sectional view of the electronic device of FIG. 4 taken on line A-A' according to an embodiment of the disclosure.
Figure 5C:
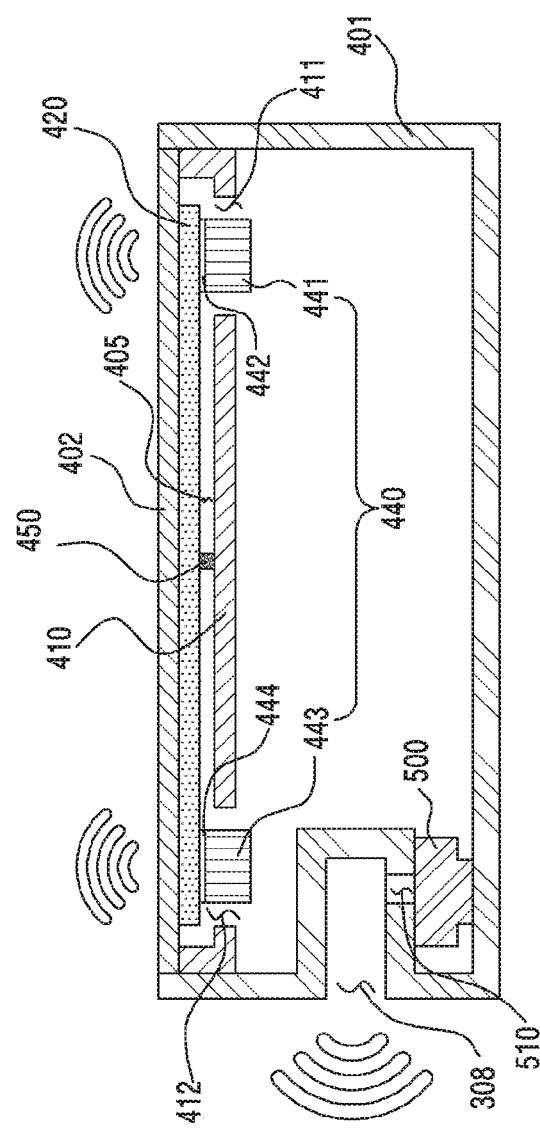
FIG. 5C is a cross-sectional view of the electronic device of FIG. 4 taken on line A-A' according to an embodiment of the disclosure.
Figure 5D:
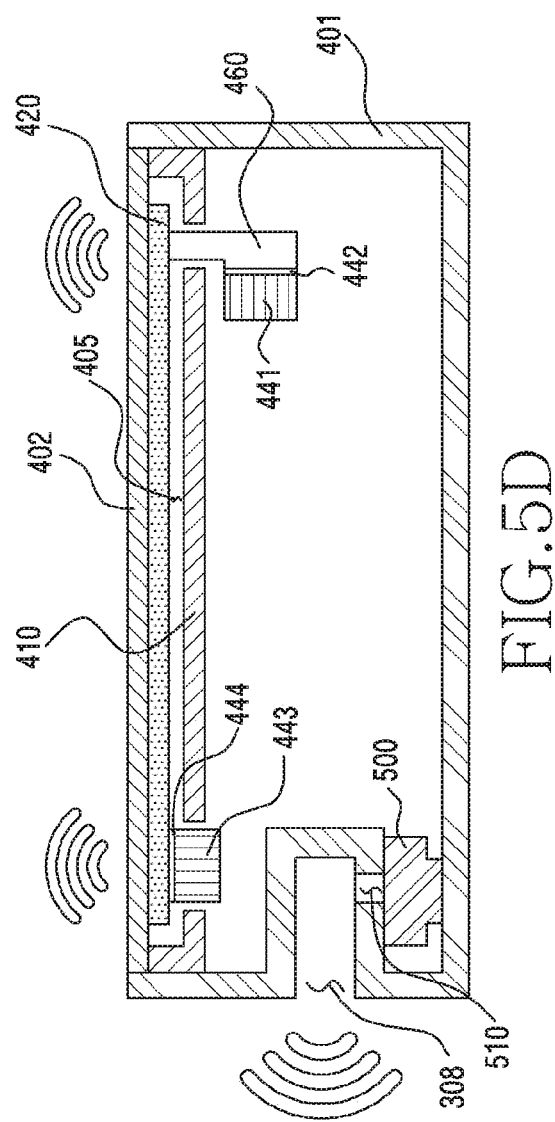
FIG. 5D is a cross-sectional view of the electronic device of FIG. 4 taken on line A-A' according to an embodiment of the disclosure.

FIG. 4 is a view schematically illustrating a state in which a speaker is disposed on a position adjacent to a first connector hole (e.g., a USB connector) inside a front surface of an electronic device 300 and some regions of the electronic device according to an embodiment of the disclosure. FIG. 5A is a cross-sectional view of the electronic device of FIG. 4 taken on line A-A' according to an embodiment of the disclosure. FIG. 5B is a cross-sectional view of the electronic device 300 of FIG. 4 taken on line A-A' according to an embodiment of the disclosure. FIG. 5C is a cross-sectional view of the electronic device of FIG. 4 taken on line A-A' according to an embodiment of the disclosure. FIG. 5D is a cross-sectional view of the electronic device 300 of FIG. 4 taken on line A-A' according to an embodiment of the disclosure.

Referring to FIGS. 4 and 5A, the electronic device 300 may include a housing 401, a transparent plate 402, a support member 410, a display 420, a vibration actuator 440, and a speaker 500. At least one of the components of the electronic device 300 may be the same as or similar to at least one of the components of the electronic device 300 of FIG. 3A, and a redundant explanation of the same or similar components will be omitted below.

According to various embodiments of the disclosure, the vibration actuator 440 may include a first actuator 441, a second actuator 443, and may implement a two-channel speaker system. As shown in FIG. 5A, the first actuator 441 may be attached to a back surface of an upper end (a direction 15 of FIG. 2) of the support member 410 through a first adhesive member 442, and the second actuator 443 may be attached to a back surface of a lower end (a direction 16 of FIG. 2) of the support member 410 through a second adhesive member 444. When an electric signal including acoustic information is inputted to the first actuator 441 and the second actuator 443, vibration may be generated on the back surface of the upper end and the back surface of the lower end of the support member 410, respectively. The vibrations generated on the support member 410 may be transmitted to the display 420, and the display 420 may serve as a vibration plate of a speaker, thereby generating a sound.

When the sound is generated through the first actuator 441 and the second actuator 443 attached to the back surface of the support member 410, a loss may be caused in the process of transmitting the vibrations generated on the support member 410 to the display 420. Therefore, the first actuator 441 and the second actuator 443 may be directly attached to a rear surface of the display 420.

Referring to FIG. 5B, the support member 410 according to an embodiment may include a first opening 411 and a second opening 412 penetrating through the inside of the support member 410. The first opening 411 and the second opening 412 may be the same as outer circumferences of the first actuator 441 and the second actuator 443 or may be larger than the outer circumferences, such that the first actuator 441 and the second actuator 443 pass through the first opening 411 and the second opening 412, respectively. The first opening 411 and the second opening 412 may have a circular shape, a rectangular shape, or a rectangular shape having rounded corners, and may have a shape corresponding to the outer circumference of the first actuator 441 or the second actuator 443, but is not limited thereto.

The first opening 411 may be formed on a region of the upper end of the support member 410, and the second opening 412 may be formed on a region of the lower end of the support member 410, and the first actuator 441 may be attached to a back surface of an upper end of the display 420 through the first opening 411 by the first adhesive member 442, and the second actuator 443 may be attached to a back surface of a lower end of the display 420 through the second opening 412 by the second adhesive member 444.

When the first actuator 441 and the second actuator 443 are attached to the back surface of the support member 410, a vibration loss may be caused in the process of transmitting the vibration generated on the support member 410 to the display 420. However, the first actuator 441 and the second actuator 443 may be attached to the back surface of the display 420 which serves as a vibration plate of the speaker, so that a loss caused in the process of transmitting a vibration can be minimized.

Referring to FIG. 5C, the electronic device 300 may further include a partition member 450. The support member 410 may be disposed or formed, spaced apart from the display 420, such that a gap 405 is formed between the support member 410 and the display 420. The partition member 450 according to an embodiment may be disposed or formed in the gap 405 formed between the support member 410 and the display 420.

The partition member 450 may be positioned between the first actuator 441 and the second actuator 443 within the gap 405 to prevent generation of interference between the sound generated by the vibration of the first actuator 441 and the sound generated by the vibration of the second actuator 443. The partition member 450 may be formed with a sound deadener of a rubber-based or asphalt-based material to prevent the interference, but is not limited thereto.

The partition member 450 may be disposed in the middle between the first actuator 441 and the second actuator 443, or may be disposed close to the first actuator 441 or close to the second actuator 443 with reference to the middle between the first actuator 441 and the second actuator 443.

In response to the same vibration, a vibration plate of a small area generates a sound of a high frequency band, and a vibration plate of a large area generates a sound of a low frequency band. A size of a vibration region of the display 420 may vary according to a position of the partition member 450.

For example, when the partition member 450 is disposed close to the first actuator 441 with reference to the middle between the first actuator 441 and the second actuator 443, a region of the display 420 that vibrates by the vibration generated at the first actuator 441 is narrower than a region of the display 420 that vibrates by the vibration generated at the second actuator 443, and accordingly, a sound of a high frequency band may be generated by the vibration of the first actuator 441 and a sound of a low frequency band may be generated by the vibration of the second actuator 443.

In another example, when the partition member 450 is disposed close to the second actuator 443 with reference to the middle between the first actuator 441 and the second actuator 443, a region of the display 420 that vibrates by the vibration generated at the first actuator 441 is larger than a region of the display 420 that vibrates by the vibration generated at the second actuator 443, and accordingly, a sound of a low frequency band may be generated by the vibration of the first actuator 441 and a sound of a high frequency band may be generated by the vibration of the second actuator 443.

The electronic device 300 can not only prevent interference between the sounds generated by the first actuator 441 and the second actuator 443 through the partition member 450, but can also adjust the frequency band of the sound generated by the first actuator 441 and the frequency band of the sound generated by the second actuator 443, variously, by adjusting the position of the partition member 450.

Referring to FIG. 5D, the electronic device 300 may further include a connection member 460. One end of the connection member 460 may be attached to a back surface of the display 420, and the first actuator 441 or the second actuator 443 may be attached to the other end of the connection member 460.

The first actuator 441 or the second actuator 443 may be attached to the connection member 460, and may be attached to the display 420 through the connection member 460, such that a resonance frequency of the first actuator 441 or the second actuator 443 is changed. For example, even if a resonance frequency is 6000 Hz when the first actuator 441 is directly attached to the display 420, the resonance frequency may be changed to 500 Hz when the first actuator 441 is attached to the connection member 460. The electronic device 300 may form a cantilever structure by attaching the vibration actuator 440 to the connection member 460, so that a vibration characteristic of the vibration actuator 440 can be variously changed. According to various embodiments of the disclosure (not shown), one end of the connection member 460 may be attached to a back surface of the support member 410, and the vibration actuator 440 may be attached to the other end, and the electronic device 300 may include one connection member 460 (e.g., FIG. 5D), or may include a plurality of connection members 460 (not shown).

Since the vibration actuator 440 has a limit on generating a sound of a high frequency band in comparison to a general speaker, the electronic device 300 may further include the speaker 500 to generate a sound of a low frequency band, and may implement N channel (N is a natural number) through the vibration actuator 440 and may implement 0.1 channel through the speaker 500.

Referring to FIG. 4 and FIGS. 5A, 5B, 5C, 5D, the electronic device 300 may have the speaker 500 disposed on a region adjacent to the first connector hole 308 (e.g., a USB connector) for accommodating a connector for exchanging power or data with an external electronic device.

It is common that a separate hole (not shown) (e.g., a speaker hole) for emitting a sound is essential when the speaker 500 is installed in the electronic device 300, but in the electronic device 300, the speaker 500 may be disposed on a region adjacent to the first connector hole 308, such that a sound generated in the speaker 500 can be emitted to the outside of the electronic device 300 through the first connector hole 308 without a separate speaker hole.

According to an embodiment of the disclosure, a slit 510 may be formed inside the first connector hole 308 to fluidly communicate with the inside of the housing 401 and the first connector hole 308, and the sound generated in the speaker 500 may be transmitted to the inside of the first connector hole 308 through the slit 510 and may be emitted to the outside of the electronic device 300. The electronic device 300 may include the first connector hole 308 having the slit 510 formed therein, and may have the speaker 500 disposed on a region adjacent to the first connector hole 308, such that a sound of a low frequency band generated in the speaker 500 can be emitted to the outside of the electronic device 300 without a separate speaker hole.

Figure 6:
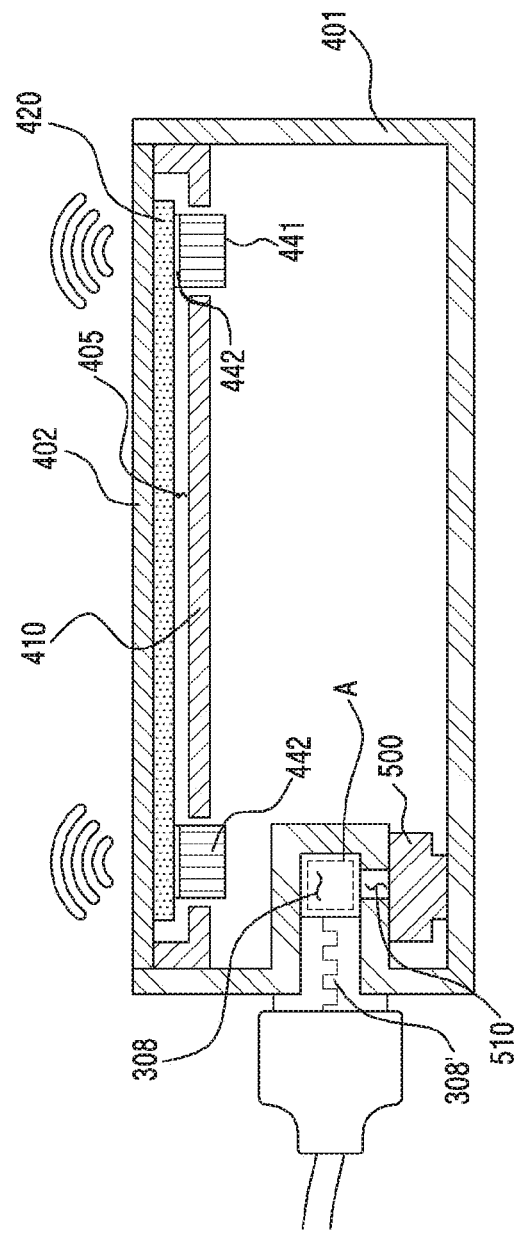
FIG. 6 is a cross-sectional view illustrating a state in which a connector is connected to a first connector hole according to an embodiment of the disclosure.

FIG. 6 is a cross-sectional view illustrating a state in which a connector is connected to a first connector hole according to an embodiment of the disclosure.

Referring to FIG. 6, in a state where the connector 308' (e.g., a USB connector) is not connected to the first connector hole 308, there is no problem in emitting the sound generated in the speaker 500 to the outside of the electronic device 300 through the first connector hole 308. However, when the connector 308' is connected to the first connector hole 308, there may be a problem in emitting the sound through the first connector hole 308.

Referring to FIG. 6, in the electronic device 300, the first connector hole 308 may be formed to have a length D1 longer than a length D2 of the connector 308', such that an inner space A is formed inside the first connector hole 308 when the connector 308' is electrically connected to the first connector hole 308. The inner space A may be formed between the inside of the first connector hole 308 and an end of the connector 308', and the slit 510 formed in the first connector hole 308 may be positioned in the inner space A. Being electrically connected refers to a state in which power or data can be exchanged between the first connector hole 308 and the connector 308', and does not only refer to a state in which the first connector hole 308 and the connector 308' are physically coupled to each other.

Since the slit 510 is positioned inside the inner space A, the sound generated in the speaker 500 can be transmitted to the inner space A in the first connector hole 308 even when the connector 308' is electrically connected to the first connector hole 308.

The sound transmitted to the inner space A can be transmitted to the outside of the electronic device 300 due to the diffraction phenomenon even when the connector 308' is electrically connected to the first connector hole 308. The electronic device 300 can emit the sound generated in the speaker 500 to the outside of the electronic device 300 even when the connector 308' is electrically connected to the first connector hole 308.

Figure 7:
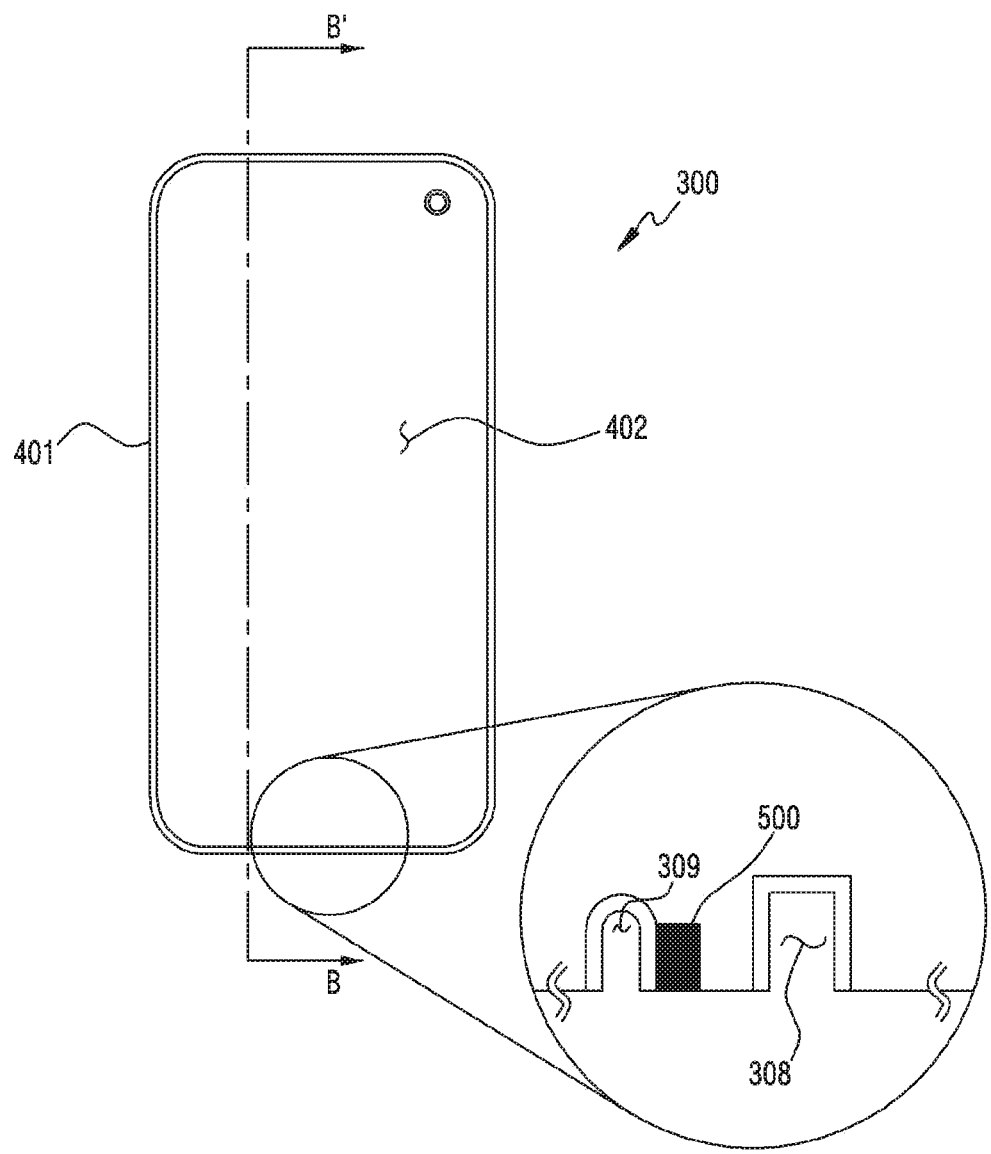
FIG. 7 is a view illustrating components disposed inside a front surface of an electronic device and some regions of the electronic device according to an embodiment of the disclosure.
Figure 8A:
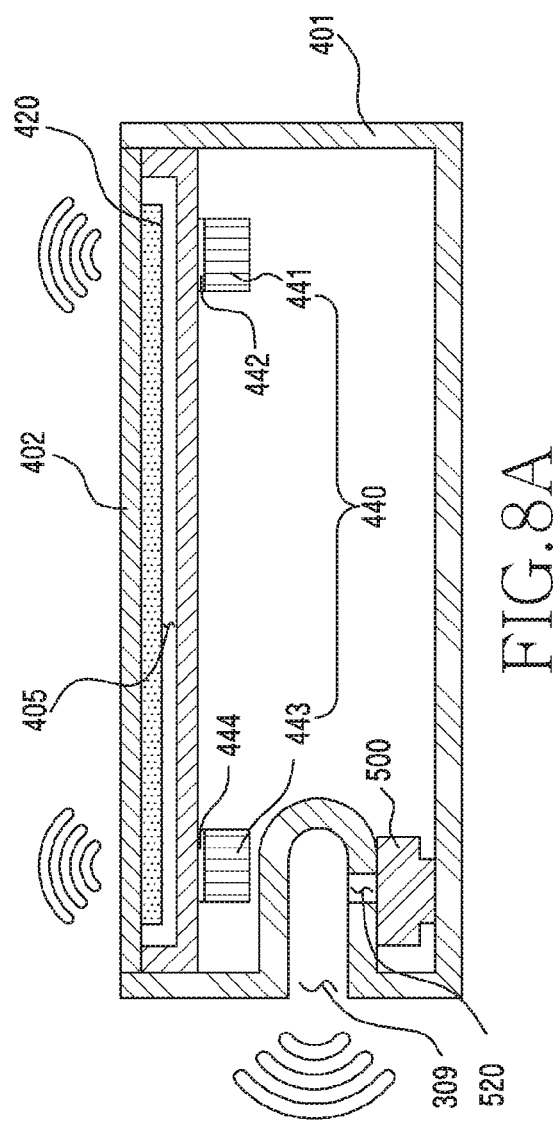
FIG. 8A is a cross-sectional view of the electronic device of FIG. 7 taken on line B-B' according to an embodiment of the disclosure.
Figure 8B:
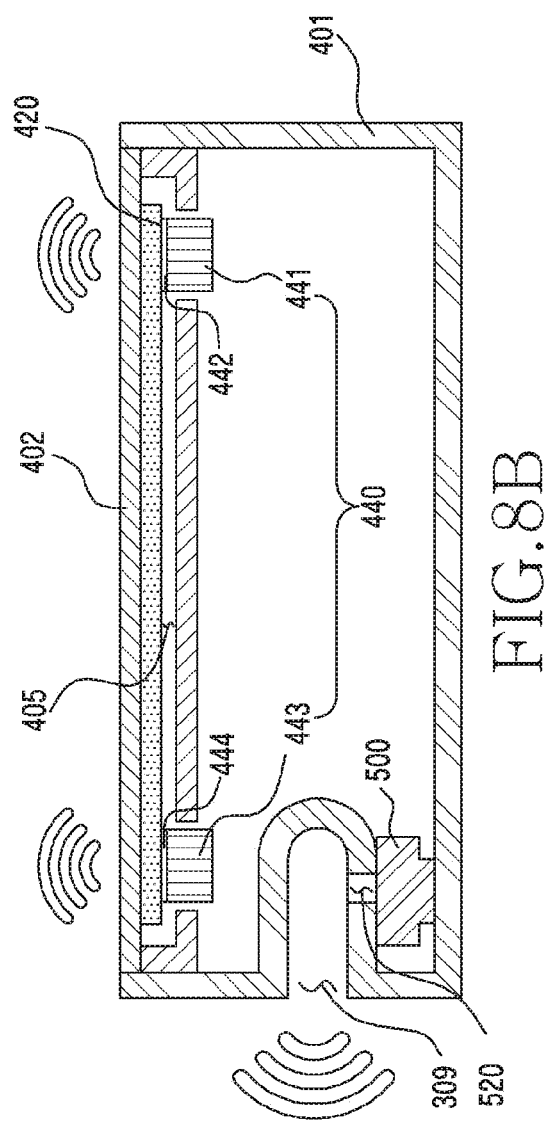
FIG. 8B is a cross-sectional view of the electronic device of FIG. 7 taken on line B-B' according to an embodiment of the disclosure.
Figure 8C:
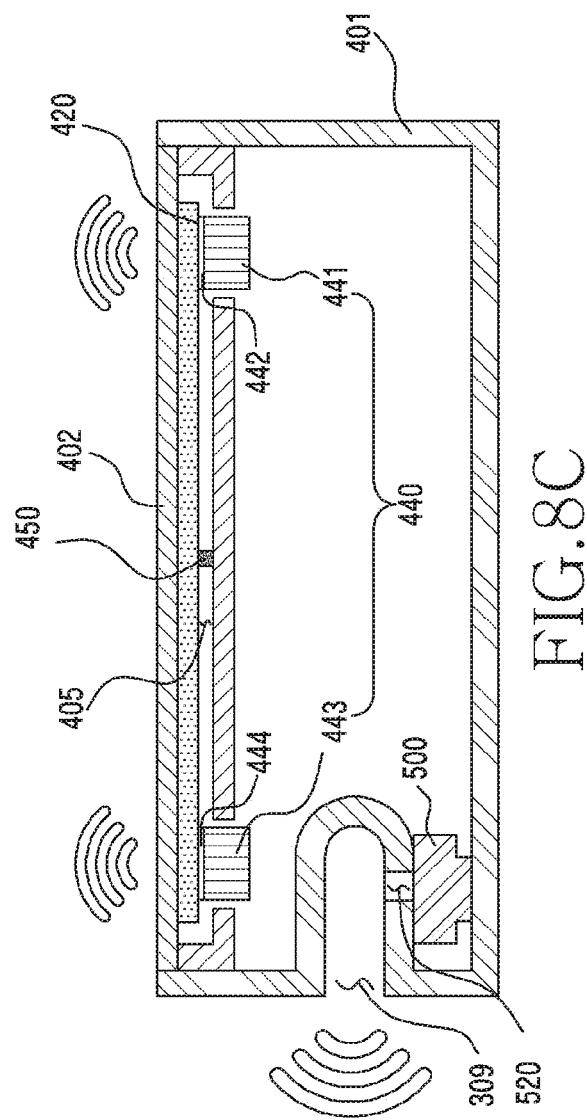
FIG. 8C is a cross-sectional view of the electronic device of FIG. 7 taken on line B-B' according to an embodiment of the disclosure.

FIG. 7 is a view schematically illustrating a state in which a speaker is disposed on a position adjacent to a second connector hole (e.g., an earphone jack) inside a front surface of an electronic device and some regions of the electronic device according to an embodiment of the disclosure. FIG. 8A is a cross-sectional view of the electronic device of FIG. 7 taken on line B-B' according to an embodiment of the disclosure. FIG. 8B is a cross-sectional view of the electronic device of FIG. 7 taken on line B-B' according to various embodiments, and FIG. 8C is a cross-sectional view of the electronic device of FIG. 7 taken on line B-B' according to an embodiment of the disclosure.

Referring to FIG. 7 and FIGS. 8A, 8B, 8C, the electronic device 300 according to various embodiments may include a housing 401, a transparent plate 402, a support member 410, a display 420, a vibration actuator 440, and a speaker 500.

The vibration actuator 440 may include a first actuator 441, a second actuator 443, and may implement a two-channel speaker system. Referring to FIG. 8A, the first actuator 441 may be attached a back surface of an upper end of the support member 410 through a first adhesive member 442, and the second actuator 443 may be attached to a back surface of a lower end of the support member 410 through a second adhesive member 444. When an electric signal including acoustic information is inputted to the first actuator 441 and the second actuator 443, vibrations may be generated on the back surface of the upper end and the back surface of the lower end of the support member 410, respectively, and the vibrations generated on the support member 410 may be transmitted to the display 420. The display 420 may serve as a vibration plate of the speaker, and may generate a sound based on the vibrations received from the support member 410.

When the first actuator 441, the second actuator 443 are attached to the back surface of the support member 410 and vibrate, and the generated vibrations are transmitted to the display 420 and the sound is generated, there may be a loss in the process of transmitting the vibrations generated on the support member 410 to the display 420. Therefore, the first actuator 441 and the second actuator 443 may be directly attached to a back surface of the display 420 through the first adhesive member 442, the second adhesive member 444, respectively, so that a loss in the vibration caused in the process of transmitting can be minimized.

Referring to FIG. 8B, the support member 410 may include a first opening 411 and a second opening 412 penetrating through the inside of the support member 410. The first opening 411 and the second opening 412 may be formed to be the same as or larger than outer circumferences of the first actuator 441 and the second actuator 443, respectively, such that the first actuator 441 and the second actuator 443 pass through the first opening 411 and the second opening 412, respectively. The first opening 411 and the second opening 412 may have a circular shape, a rectangular shape, or a rectangular shape having rounded corners, or may have a shape corresponding to the outer circumference of the first actuator 441 or the second actuator 443. However, this should not be considered as limiting.

The first opening 411 may be formed on a region of the upper end of the support member 410, and the second opening 412 may be formed on a region of the lower end of the support member 410, and the first actuator 441 may be attached to a back surface of an upper end of the display 420 through the first opening 411, and the second actuator 443 may be attached to a back surface of a lower end of the display 420 through the second opening 412.

The first actuator 441 and the second actuator 443 may be attached to the back surface of the display 420 serving as a vibration plate of the speaker, so that a loss in vibrations caused in the process of transmitting the vibrations can be reduced and thus acoustic performance of the electronic device 300 can be enhanced.

Referring to FIG. 8C, the electronic device 300 may further include a partition member 450. The support member 410 may be disposed or formed, spaced apart from the display 420, such that a gap 405 is formed between the support member 410 and the display 420, and the partition member 450 according to an embodiment may be disposed or formed in the gap 405 formed between the support member 410 and the display 420.

The partition member 450 may be positioned between the first actuator 441 and the second actuator 443 in the gap 405 to prevent generation of interference between the sound generated by the vibration of the first actuator 441 and the sound generated by the vibration of the second actuator 443. The partition member 450 may be formed with a sound deadener of a rubber-based or asphalt-based material to prevent the interference, but is not limited thereto.

The partition member 450 may be disposed in the middle between the first actuator 441 and the second actuator 443, and according to an embodiment, the partition member 450 may be disposed close to the first actuator 441 or close to the second actuator 443 with reference to the middle between the first actuator 441 and the second actuator 443.

In response to the same vibration, a vibration plate of a small area generates a sound of a high frequency band, and a vibration plate of a large area generates a sound of a low frequency band. A size of a vibration region of the display 420 may vary according to a position of the partition member 450. Accordingly, a frequency band of the sound generated in the region of the display 420 to which the first actuator 441 is attached, and a frequency band of the sound generated in the region of the display 420 to which the second actuator 443 is attached may be different from each other.

For example, when the partition member 450 is disposed close to the first actuator 441 with reference to the middle between the first actuator 441 and the second actuator 443, the region of the display 420 that vibrates by the vibration generated at the first actuator 441 is narrower than the region of the display 420 that vibrates by the vibration generated at the second actuator 443, and accordingly, a sound of a high frequency band may be generated by the vibration of the first actuator 441 and a sound of a low frequency band may be generated by the vibration of the second actuator 443.

The electronic device 300 can prevent interference between the sounds generated by the first actuator 441 and the second actuator 443 through the partition member 450, while adjusting the frequency band of the sound generated by the first actuator 441 and the frequency band of the sound generated by the second actuator 443, variously, by adjusting the position of the partition member 450.

Although not shown in FIG. 8C, the electronic device 300 may further include a connection member (e.g., 460 of FIG. 5D) which has one end attached to a back surface of the display 420 or a back surface of the support member 410, and the other end attached to the vibration actuator 440 to adjust a vibration characteristic (e.g., a resonance frequency) of the vibration actuator 440. The connection member is the same as described above and a detailed description thereof is omitted.

The electronic device 300 may further include the speaker 500 to generate a sound of a low frequency band, in addition to the vibration actuator 440. Referring to FIG. 7 and FIGS. 8A, 8B, 8C, the speaker 500 may be disposed on a region adjacent to the second connector hole 309, and may emit a sound to the outside of the electronic device 300 through the second connector hole 309.

The second connector hole 309 may be a hole (e.g., an earphone jack) formed in the housing 401 of the electronic device 300 to accommodate a connector (not shown) for exchanging an audio signal with an external electronic device, and the electronic device 300 according to an embodiment may have the speaker 500 disposed on a region adjacent to the second connector hole 309 and may emit a sound to the outside through the second connector hole 309.

A slit 520 may be formed inside the second connector hole 309 to fluidly communicate with the second connector hole 309 and the inside of the housing 401. A sound generated in the speaker 500 within the housing 401 may be transmitted to the inside of the second connector hole 309 through the slit 520, and the sound transmitted to the inside of the second connector hole 309 may spread to the outside of the electronic device 300. Therefore, the electronic device 300 can emit a sound to the outside of the electronic device 300 without forming a separate hole for emitting a sound.

When a connector (not shown) is electrically connected to the second connector hole 309, a sound should be generated in an external electronic device (e.g., an earphone), not in the vibration actuator 440 or the speaker 500 within the electronic device. Therefore, an operation of the speaker 500 does not cause a problem when the second connector hole 309 and the connector are electrically connected with each other.

Figure 9:
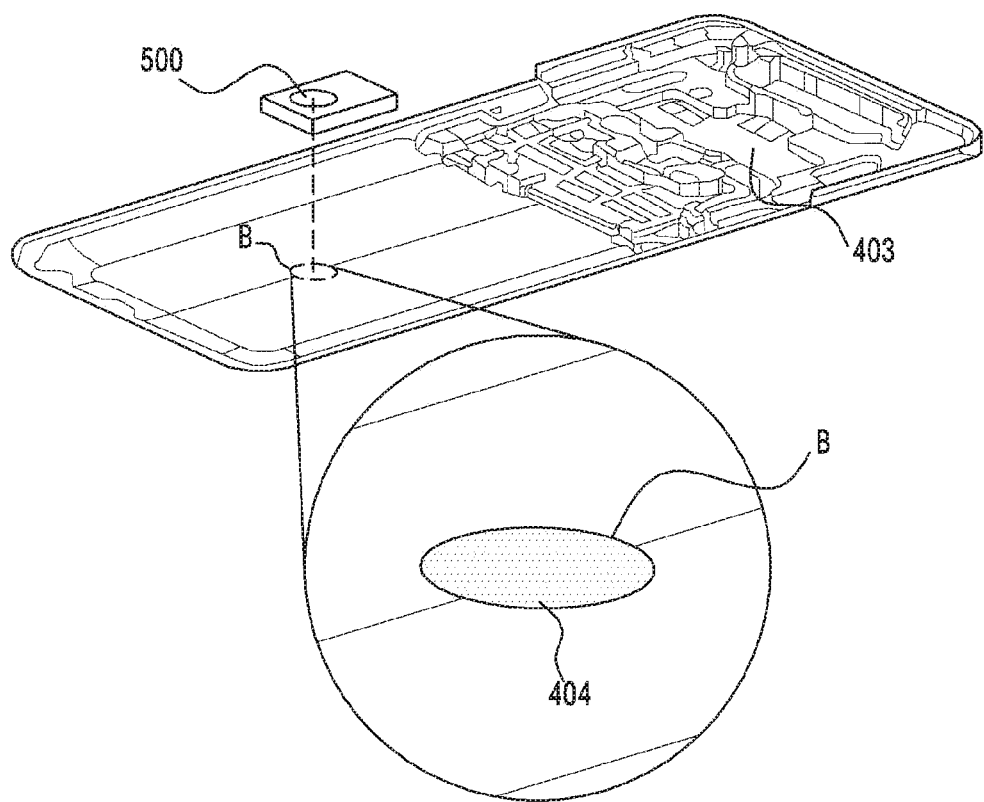
FIG. 9 is an exploded perspective view of some components of an electronic device according to an embodiment of the disclosure.
Figure 10A:
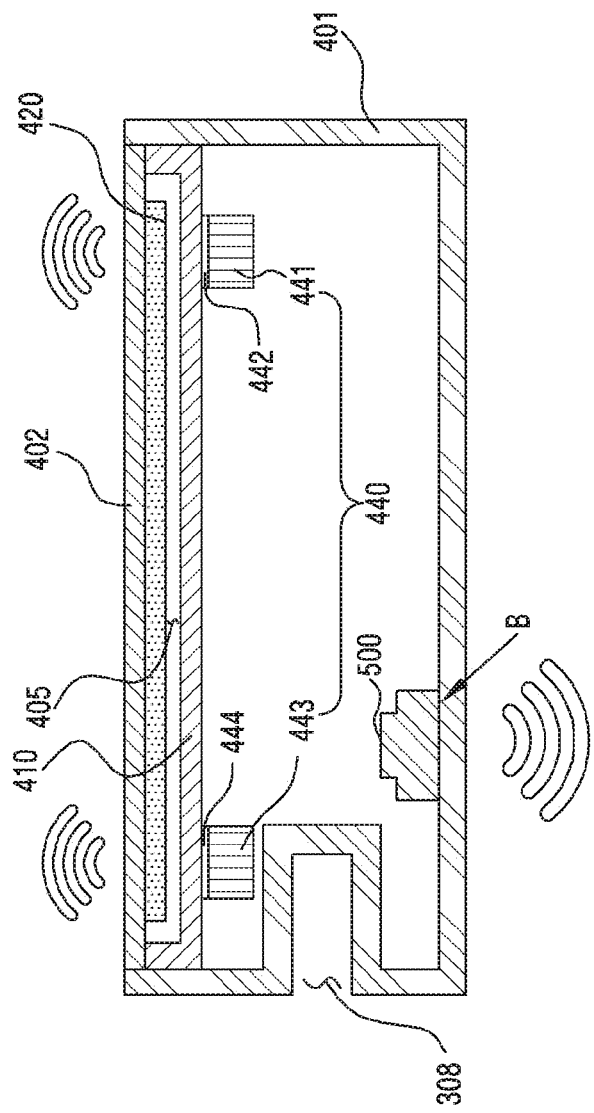
FIG. 10A is a cross-sectional view of the electronic device of FIG. 9 according to an embodiment of the disclosure.
Figure 10B:
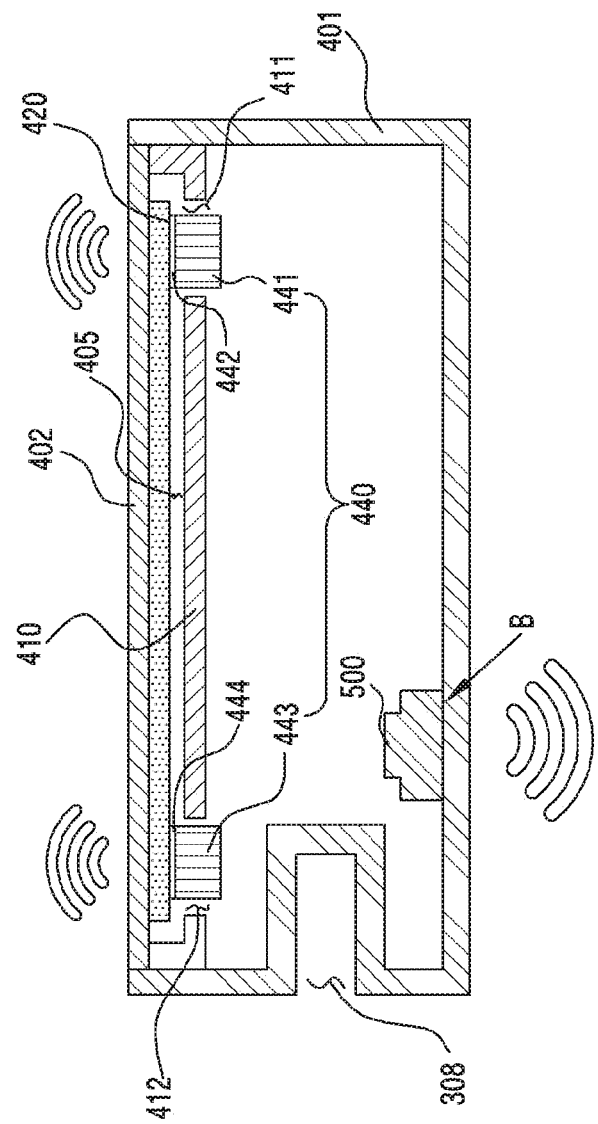
FIG. 10B is a cross-sectional view of the electronic device of FIG. 9 according to an embodiment of the disclosure.

FIG. 9 is an exploded perspective view of some components (the rear plate 403 and the speaker 500) of an electronic device according to an embodiment of the disclosure. FIG. 10A is a cross-sectional view of the electronic device 300 of FIG. 9 according to an embodiment of the disclosure. FIG. 10B is a cross-sectional view of the electronic device 300 of FIG. 9 according to an embodiment of the disclosure.

Referring to FIG. 9 and FIGS. 10A-10C, the electronic device 300 according to various embodiments may include a housing 401, a transparent plate 402, a rear plate 403, a support member 410, a display 420, a vibration actuator 440, and a speaker 500. At least one of the components of the electronic device 300 may be the same as or similar to at least one of the components of the electronic device 300 of FIG. 3, and a position (e.g., the support member 410 or the display 420) to which the vibration actuator 440 is attached may be the same as or similar to the position to which the vibration actuator 440 of the electronic device 300 of FIGS. 5A and 5B or the electronic device 300 of FIGS. 8A, 8B, 8C is attached. An explanation of the same or similar components as those previously described will be omitted.

Referring to FIG. 9, the rear plate 403 of the electronic device 300 may include a humidity control region B formed in a certain region thereof. At least one air vent hole 404 may be formed on the humidity control region B. The electronic device 300 may control humidity inside the electronic device 300 by discharging internal air of the electronic device 300 to the outside of the electronic device 300 through the at least one air vent hole 404 formed on the humidity control region B.

The humidity control region B may be formed with a waterproof material different from that of the other region of the rear plate 403, and may prevent water from permeating the electronic device 300 from the outside through the air vent hole 404, while discharging internal air of the electronic device 300 to the outside through the air vent hole 404. For example, the humidity control region B may be formed with a waterproof material such as Gore-Tex, and the humidity control region B may be formed on the transparent plate 402, a side surface (e.g., 310C of FIG. 2A) of the housing 401, in addition to the rear plate 403.

Referring to FIG. 9 or FIGS. 10A and 10B, the speaker 500 may be disposed on the humidity control region B having the least one air vent hole 404 formed thereon, and a sound of a low frequency band generated in the speaker 500 may be emitted to the outside of the electronic device 300 through the at least one air vent hole 404 formed on the humidity control region B. The electronic device 300 may have the speaker 500 disposed a region adjacent to the air vent hole 404, and may emit a sound through the air vent hole 404, such that the electronic device 400 can emit a sound to the outside of the electronic device 300 without forming a separate hole for emitting a sound.

Figure 11:
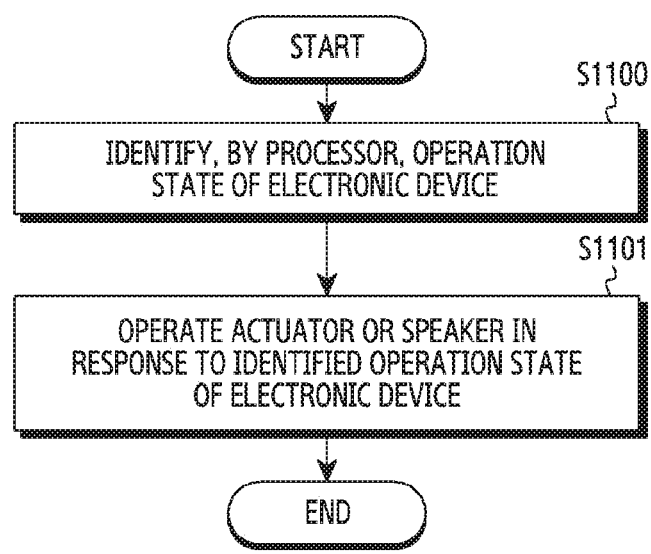
FIG. 11 is a sequence diagram illustrating a process of operating an actuator or a speaker according to an operation state in an electronic device according to an embodiment of the disclosure.
Figure 12A:
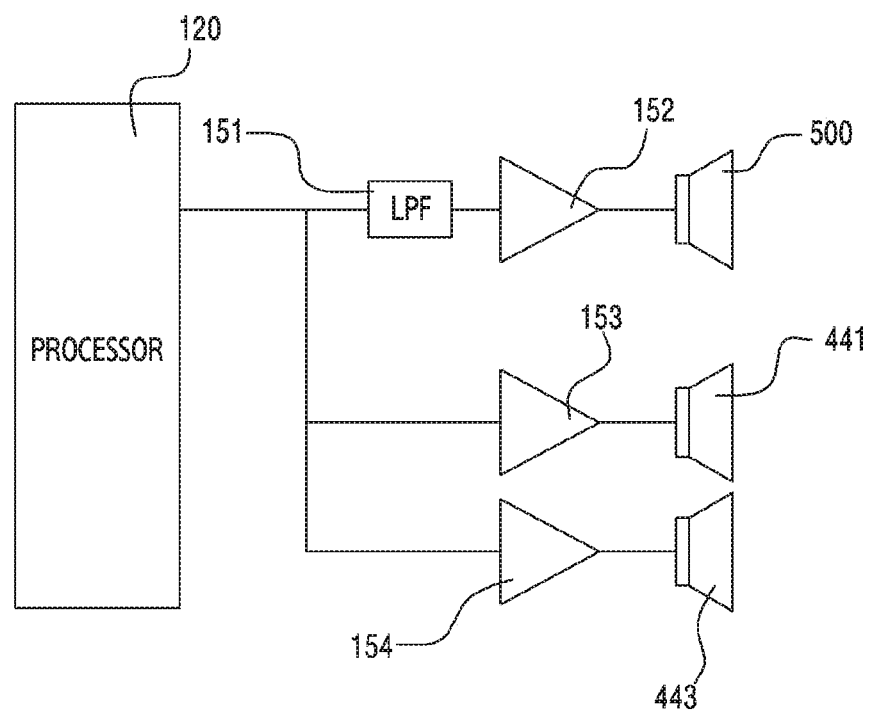
FIG. 12A is a view illustrating a signal processing process of a processor according to a user's operation in a call mode according to an embodiment of the disclosure.

FIG. 11 is a sequence diagram illustrating a process of operating an actuator or a speaker according to an operation state in an electronic device according to an embodiment of the disclosure. FIG. 12A is a view illustrating a signal processing process of a processor according to a user's operation in a call mode, and FIG. 12B is a view illustrating a signal processing process of the processor according to a user's operation in a call mode according to various embodiments of the disclosure.

Figure 12B:
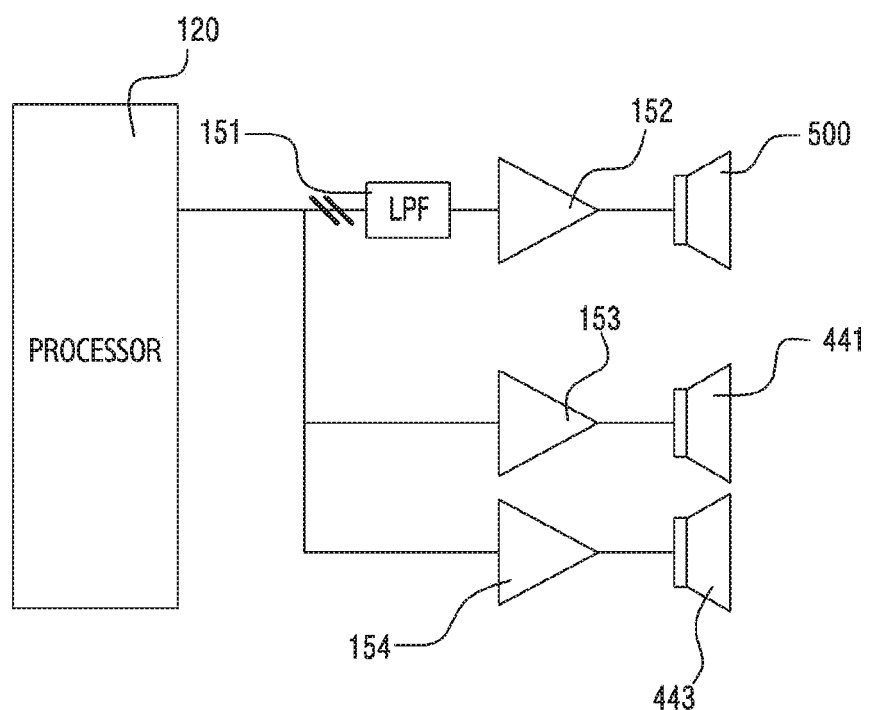
FIG. 12B is a view illustrating a signal processing process of the processor according to a user's operation in a call mode according to an embodiment of the disclosure.

Referring to FIGS. 12A and 12B, an electronic device (e.g., the electronic device 300 of FIG. 3) may further include an audio processing circuitry (not shown), a processor 120, and an amplifier 152, 153, and 154.

The audio processing circuitry may be disposed inside a housing (e.g., the housing 401 of FIG. 3) of the electronic device, and may be electrically connected with a vibration actuator 441, 443 or a speaker 500 for generating a sound.

The processor 120 may be disposed inside the housing of the electronic device, and may be electrically connected with the audio processing circuitry, and may control an operation of the actuator 441, 443 or the speaker 500 through the audio processing circuitry.

The amplifier 152, 153, and 154 may amplify an electric signal including acoustic information and may transmit the electric signal to the speaker 500 or the actuator 441, 443. For example, a first amplifier 152 may amplify an electric signal to be transmitted to the speaker 500, and a second amplifier 153 and a third amplifier 154 may amplify electric signals to be transmitted to a first actuator 441, a second actuator 443.

Referring to FIG. 11, according to an embodiment, the processor 120 may identify an operation state of the electronic device (e.g., the electronic device 300 of FIG. 3) in operation S1100. For example, the user may play back a multimedia or make a call through the electronic device, and the processor 120 may identify whether the electronic device is playing back a multimedia or is making a call.

In operation S1101, the processor 120 may operate the vibration actuator 441, 443 or the speaker 500 based on the operation state (e.g., playing back multimedia content, making a call) of the electronic device identified in operation S1100. For example, the processor 120 may differently control the operation of the vibration actuator 441, 443 and the speaker 500 according to a call mode when the user is playing back a multimedia or is making a call.

Referring to FIG. 12A, when the user is making a call in a hand-free mode or is playing back a multimedia, the processor 120 according to an embodiment may operate both the vibration actuator 441, 443 and the speaker 500 and may generate sounds since it is important to transmit a sound.

Referring to FIG. 12B, according to another embodiment of the disclosure, when the user is making a call in a hand-set mode, the user can talk only with a sound generated on a display (e.g., the display 420 of FIG. 3) since the user's ear is close to the electronic device, and accordingly, the processor 120 may generate a sound by operating only the vibration actuator 441, 443.

Referring to FIGS. 12A and 12B, the electronic device may further include a low pass filter (LPF) 151. In a multi-channel speaker system, a sound is typically generated by using a speaker specialized for a low frequency band. Since an existing speaker emits a sound through a hole (e.g., a speaker hole) separately formed within an electronic device, there is no problem in transmitting the sound to a user. However, in the electronic device according to the above-described embodiments of the disclosure, a sound generated in the speaker (e.g., the speaker 500 of FIG. 3) is emitted not through a hole formed for emitting a sound, but through a first connector hole (e.g., a USB connector), a second connector hole (e.g., an earphone jack), an assembly gap between components, and/or an air vent hole (e.g., the air vent hole 404 of FIG. 9), and thus there may be a problem in transmitting the sound (e.g., a weak sound).

Specifically, since the first connector hole, the second connector hole, the assembly gap (or assembly hole), and/or the air vent hole are formed for other purposes rather than for the purpose of emitting a sound, the first connector hole, the second connector hole, the assembly gap, and/or the air vent hole may have smaller diameters than that of the hole formed for the purpose of emitting a sound, and an energy loss may be caused in the process of emitting the sound. According to various embodiments of the disclosure, the electronic device may transmit only a signal of a low frequency band to the speaker 500 through the low pass filter 151. As only the signal of the low frequency band is transmitted to the speaker through the low pass filter 151, an energy loss of the speaker caused by a signal of an intermediate or high frequency band can be reduced. Therefore, the electronic device can smoothly transmit a sound to a user without a problem that a sound is weak when the sound is emitted through the first connector hole, the second connector hole, or the air vent hole.

Figure 13:
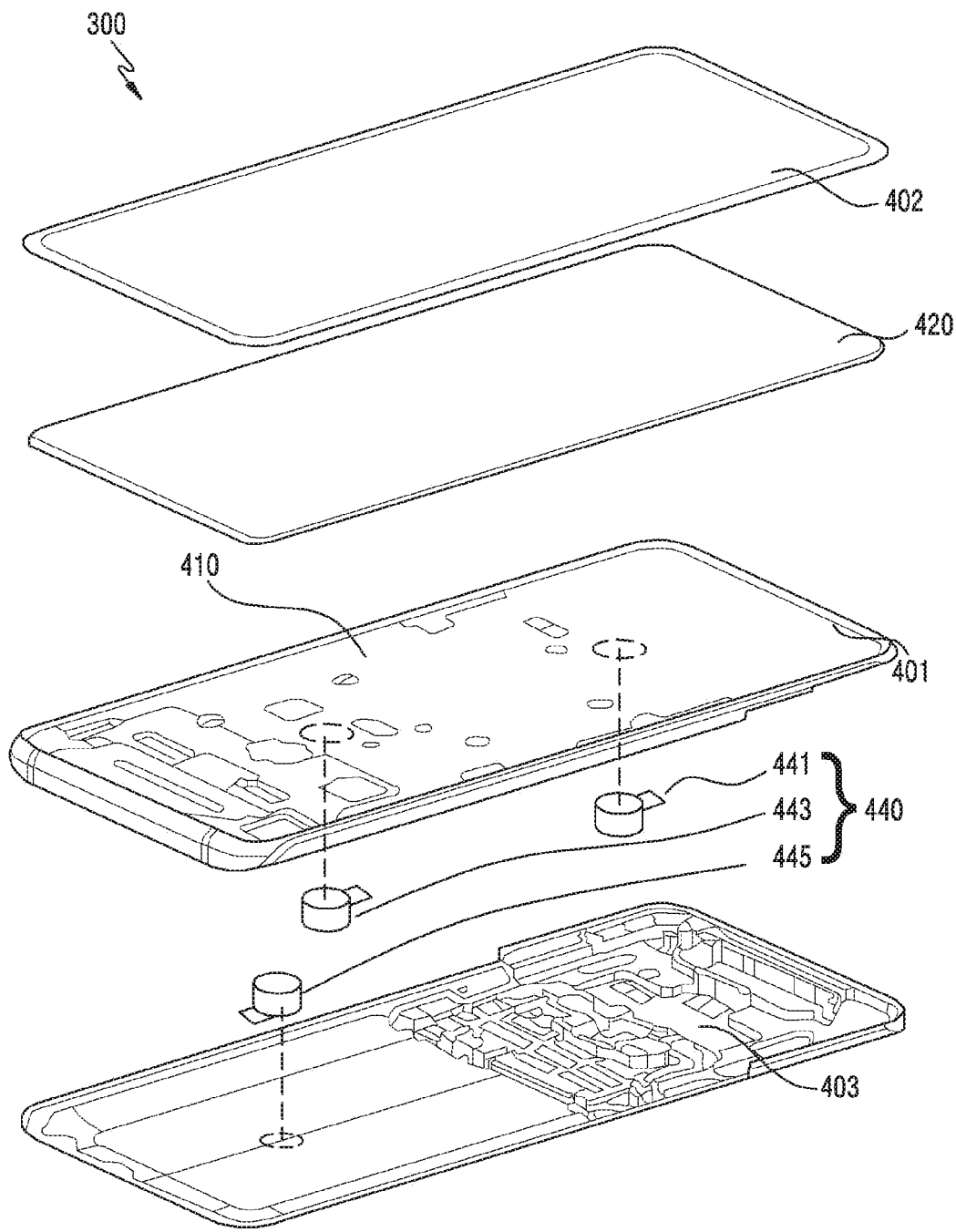
FIG. 13 is an exploded perspective view of an electronic device according to an embodiment of the disclosure.
Figure 14A:
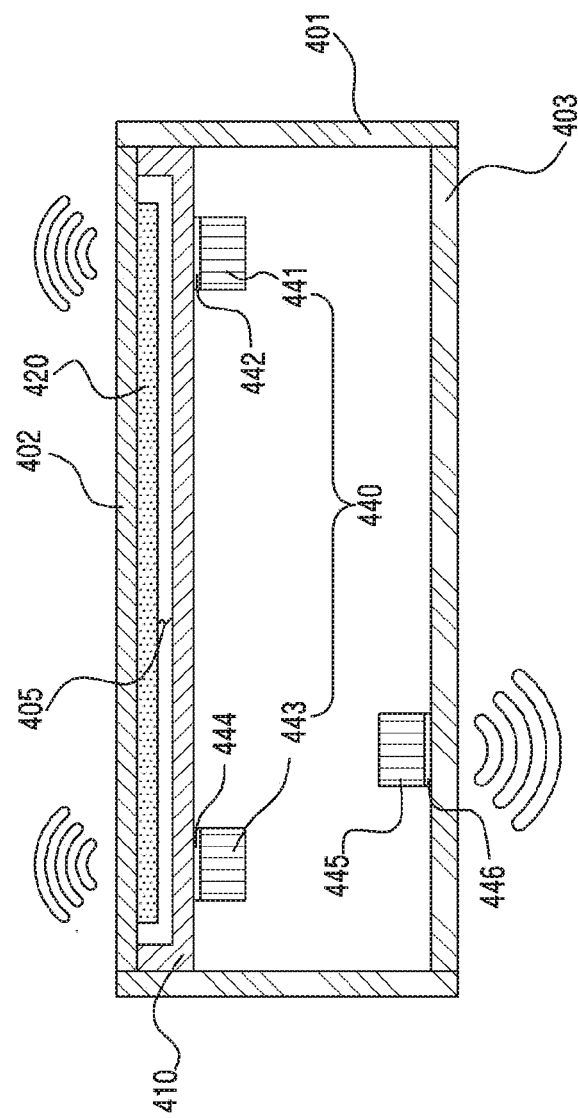
FIG. 14A is a cross-sectional view of the electronic device of FIG. 13 according to an embodiment of the disclosure.
Figure 14B:
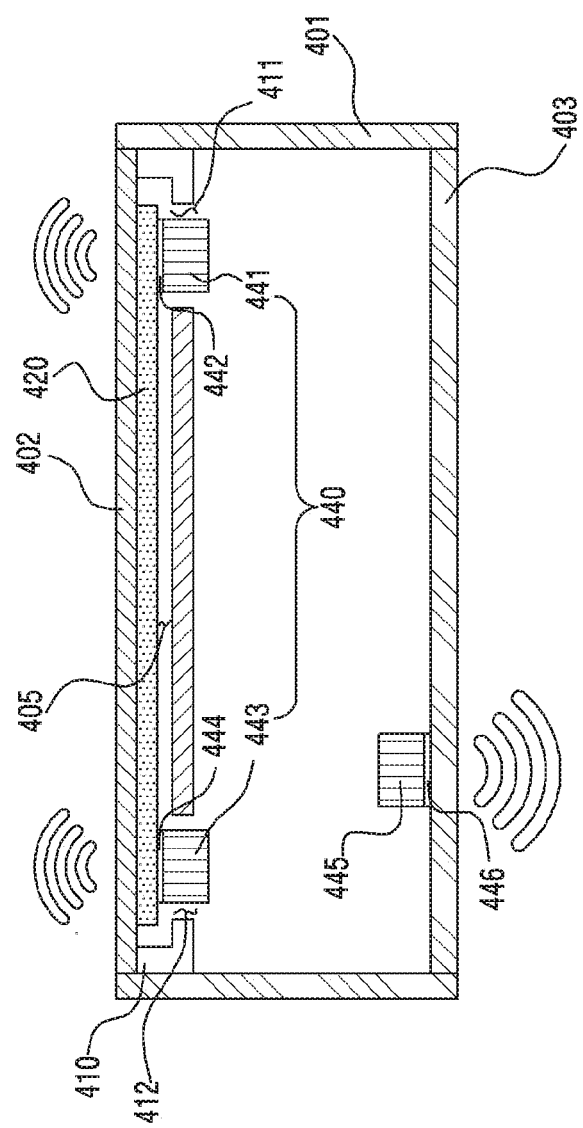
FIG. 14B is a cross-sectional view of the electronic device of FIG. 13 according to an embodiment of the disclosure.

FIG. 13 is an exploded perspective view of an electronic device according to an embodiment of the disclosure. FIG. 14A is a cross-sectional view of the electronic device according to an embodiment of the disclosure. FIG. 14B is a cross-sectional view of the electronic device according to an embodiment of the disclosure.

Referring to FIG. 13 and FIGS. 14A and 14B, the electronic device 300 may include a housing 401, a transparent plate 402, a rear plate 403, a support member 410, a display 420, and a vibration actuator 440. At least one of the components of the electronic device 300 may be the same as or similar to at least one of the components of the electronic device 300 of FIG. 3, and a redundant explanation is omitted.

In addition, the electronic device 300 may further include an audio processing circuitry and/or a processor (e.g., the processor 120 of FIG. 12A) electrically connected with the vibration actuator 440, and the processor may control an operation of the vibration actuator 440 according to an operation of the electronic device. For example, the processor may operate only some vibration actuators 440 of a plurality of vibration actuators 440 according to an operation of the electronic device. Since the processor of the electronic device 300 is the same as or similar to the processor of the electronic device of FIG. 12A or 12B described above, a redundant explanation is omitted.

The electronic device 300 may use wireless charging technology, short-range wireless communication technology (e.g., Bluetooth), and may not be provided with a connector hole (e.g., the connector hole 308, 309 of FIG. 3) for exchanging power and/or data with an external electronic device, or for exchanging an audio signal, and may not be provided with a separate hole (e.g., a speaker hole) for emitting a sound, which is different from the electronic device (e.g., the electronic device 300 of FIG. 3) of the above-described embodiments.

The electronic device 300 without the connector hole and the speaker hole may emit a sound to the outside of the electronic device 300 through the vibration actuator 440. The vibration actuator 440 may include a first actuator 441, a second actuator 443, and a third actuator 445. According to various embodiments, the first actuator 441 or the second actuator 443 may be attached to a back surface of the support member 410 (e.g., FIG. 14A), or may be attached to a back surface of the display 420 through a first opening 411, a second opening 412, and generate a sound, thereby implementing a two-channel speaker system of an intermediate or high frequency band. The first actuator 441 or the second actuator 443 may be attached to the back surface of the support member 410 or the display 420 through a first adhesive member 442 or a second adhesive member 444, and the process of generating a sound by the first actuator 441, the second actuator 442 is the same as described above, and thus a detailed description thereof is omitted. The electronic device 300 may further include a partition member (e.g., the partition member 450 of FIG. 5C) like the electronic device 300 of FIG. 5C described above, or may further include a connection member (e.g., the connection member 460 of FIG. 5D) like the electronic device 300 of FIG. 5D.

The third actuator 445 may attached to a back surface of the housing 401 (i.e., to a certain region of the rear plate 403), through a third adhesive member 446, thereby generating a sound of a low frequency band. There may be a problem that it is difficult to generate a sound of a low frequency band through the vibration actuator 440 due to a characteristic of the vibration actuator 440 (a frequency characteristic of a low frequency band is not good). However, the electronic device 300 may have the third actuator 445 attached to the rear plate 403, such that a sound of a low frequency band can be efficiently generated through the third actuator 445. The rear plate 403 may be formed with a material (e.g., plastic, aluminum) of stiffness lower than that of the support member 410 or the display 520 to which the first actuator 441, the second actuator 443 is attached.

A frequency of vibrations generated in the vibration actuator 440 may be inversely proportional to stiffness of an element (e.g., the support member 410, the display 420) to which the vibration actuator 440 is attached. For example, when the vibration actuator 440 is attached to an element having second stiffness lower than first stiffness, more vibrations may be generated than when the vibration actuator 440 is attached to an element having the first stiffness. The third actuator 445 may be attached to a certain region of the rear plate 403 having stiffness lower than that of the support member 410 or the display 420, and may generate more vibrations than when being attached to other region, so that a sound of a low frequency band can be efficiently generated.

In the electronic device 300, the first actuator 441, the second actuator 443 may be attached to the back surface of the support member 410 or the display 420 to generate a sound of an intermediate or high frequency band, such that a two-channel speaker system is implemented. The third actuator 445 may be attached to the rear plate 403 and may generate a sound of a low frequency band, such that 0.1 channel is implemented. As a result, the electronic device 300 can implement a speaker system of 2.1 channel through the first actuator 441, the second actuator 443, and the third actuator 445, without forming a connector hole (e.g., 308, 309 of FIG. 3) and a speaker hole.

According to another embodiment of the disclosure, the first actuator 441, the second actuator 443, or the third actuator 445 may not only generate a sound, but may also implement a haptic function on the display 420 or the rear plate 403 through a vibration. The vibration actuator 440 according to various embodiments may further include a plurality of actuators in addition to the first actuator 441, the second actuator 443, and the third actuator 445.

Figure 15:
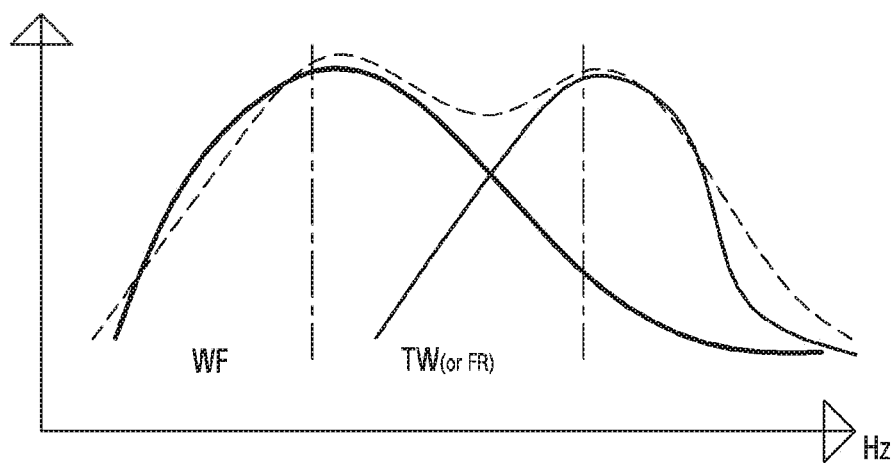
FIG. 15 is a graph illustrating frequency bands of sounds generated in an electronic device according to an embodiment of the disclosure.

FIG. 15 is a graph illustrating frequency bands of sounds generated in an electronic device according to an embodiment of the disclosure.

Referring to FIG. 15, the electronic device may generate a sound of an intermediate or high frequency band (e.g., Tweeter (TW) or full range (FR) of FIG. 15) through a vibration actuator (e.g., the vibration actuator 441, 443 of FIG. 3) attached to a back surface of a support member (e.g., the support member 410 of FIG. 5A) or a display (e.g., the display 420 of FIG. 5B), and may have a speaker (e.g., the speaker 500 of FIG. 5A) positioned on a region adjacent to a connector hole (e.g., the first connector hole 308 of FIG. 5A or the second connector hole 309 of FIG. 8A), or an air vent hole (e.g., the air vent hole 404 of FIG. 9), thereby emitting a sound of a low frequency band (e.g., Woofer (WF) of FIG. 15) to the outside of the electronic device through the connector hole or the air vent hole.

The electronic device according to another embodiment of the disclosure may generate a sound of an intermediate or high frequency band (Tweeter (TW) or full range (FR) of FIG. 15) through a vibration actuator (e.g., the vibration actuator 441, 443 of FIG. 14A) attached to a back surface of a support member (e.g., the support member 410 of FIG. 14A) or a display (e.g., the display 420 of FIG. 14B), and may generate a sound of a low frequency band (e.g., Woofer (WF) of FIG. 15) through another vibration actuator (e.g., the third actuator 445 of FIG. 14A) attached to a rear plate (e.g., the rear plate 403 of FIG. 14A).

The electronic device according to various embodiments of the disclosure may omit a separate speaker hole for emitting a sound, and can generate sounds of various band widths (indicated by the dashed line of FIG. 15) by using holes (e.g., a connector hole) formed within the electronic device for other purposes, and when a separate hole is not formed within the electronic device, the electronic device can introduce a holeless design thereinto and can generate sounds of various bandwidths (indicated by the dashed line of FIG. 15) by using a plurality of vibration actuators.

An electronic device (e.g., the electronic device 300 of FIG. 3A) according to an embodiment of the disclosure may include: a housing (e.g., the housing 401 of FIG. 5B); a display (e.g., the display 420 of FIG. 5B) which is attached to the housing to be seen from an outside; an actuator (e.g., the vibration actuator 440 of FIG. 5B) which is attached to a back surface of the display to vibrate the display and to generate a sound of a first frequency band; a hole (e.g., the first connector hole 308 of FIG. 5A, the second connector hole 309 of FIG. 8A) which is formed on one side surface of the housing; and a speaker (e.g., the speaker 500 of FIG. 5A) which is positioned on a region adjacent to the hole to generate a sound of a second frequency band different from the first frequency band through the hole, and the actuator may include: a first actuator (e.g., the first actuator 441 of FIG. 5B) which is attached to a certain region of the back surface of the display to vibrate the display; and a second actuator (e.g., the second actuator 443 of FIG. 5B) which is attached to a back surface of the display spaced apart from the first actuator by a designated distance to vibrate the display.

According to an embodiment of the disclosure, the electronic device may further include a partition member (e.g., the partition member 450 of FIG. 5C) which is positioned between the first actuator and the second actuator.

According to an embodiment of the disclosure, the first frequency band may be higher than the second frequency band.

According to an embodiment of the disclosure, the electronic device may further include a low pass filter (e.g., the low pass filter 151 of FIG. 12A) configured to generate a sound of a low frequency band in the speaker.

According to an embodiment of the disclosure, the hole may be a first connector hole (e.g., the first connector hole 308 of FIG. 5A) configured to accommodate a connector for exchanging power or data with an external electronic device, or a second connector hole (e.g., the second connector hole 309 of FIG. 8A) configured to accommodate a connector for exchanging an audio signal with an external electronic device.

According to an embodiment of the disclosure, the electronic device may further include a slit (e.g., the slit 510 of FIG. 5A, the slit 520 of FIG. 8A) which is formed inside the hole to emit a sound generated in the speaker to the outside of the electronic device.

According to an embodiment of the disclosure, the first connector hole may have an inner space (e.g., the inner space A of FIG. 6) formed between an inside of the first connector hole and a connector when the first connector hole and the connector are electrically connected with each other.

According to an embodiment of the disclosure, when the connector is electrically connected to the first connector hole, the electronic device may emit a sound generated in the speaker to the outside of the electronic device through the inner space.

According to an embodiment of the disclosure, the electronic device may further include at least one connection member (e.g., the connection member 460 of FIG. 5D) having one end attached to a back surface of the display, and the actuator may be attached to the other end of the at least one connection member.

According to an embodiment of the disclosure, the electronic device may further include: an audio processing circuitry which is positioned inside the housing and is electrically connected with the actuator or the speaker; and a processor (e.g., the processor 120 of FIG. 12A) which is positioned inside the housing and is electrically connected with the audio processing circuitry (not shown).

According to an embodiment of the disclosure, the processor may be configured to operate only the at least one actuator when the electronic device is operated in a hand-set mode.

An electronic device according to another embodiment of the disclosure may include: a housing (e.g., the housing 401 of FIG. 10A) including a first region (e.g., the region B of FIG. 9) in which at least one air vent hole (e.g., the air vent hole 404 of FIG. 9) is formed; a display (e.g., the display 420 of FIG. 10A) which is attached to the housing to be seen from an outside; an actuator (e.g., the first actuator 441, the second actuator 443 of FIG. 10A) which is attached to a back surface of the display to vibrate the display and to generate a sound of a first frequency band; and a speaker (e.g., the speaker 500 of FIG. 10A) which is positioned in the first region to generate a sound of a second frequency band which is lower than the first frequency band through the at least one air vent hole, and the actuator may include: a first actuator (e.g., the first actuator 441 of FIG. 10A) which is attached to a certain region of a back surface of the display to vibrate the display; and a second actuator (e.g., the second actuator 443 of FIG. 10A) which is attached to a back surface of the display spaced apart from the first actuator by a designated distance to vibrate the display.

According to an embodiment of the disclosure, the first region may be formed with a waterproof material.

According to an embodiment of the disclosure, the electronic device may further include a low pass filter (e.g., the low pass filter 151 of FIG. 12A) configured to generate a sound of a low frequency band in the speaker.

An electronic device (e.g., the electronic device 300 of FIG. 13) according to another embodiment of the disclosure may include: a housing (e.g., the housing 401 of FIG. 13) including a first surface (e.g., the transparent plate 402 of FIG. 13) facing in a first direction, a second surface (e.g., the rear plate 403 of FIG. 13) facing in a second direction opposite to the first direction, and a side surface extended along borders of the first surface and the second surface to form an inner space; a display (e.g., the display 420 of FIG. 13) which is seen from an outside through the first surface of the housing; a first actuator (e.g., the first actuator 441 of FIG. 13) which is attached to a back surface of an upper end of the display to vibrate the display and to generate a sound of a first frequency band; a second actuator (e.g., the second actuator 443 of FIG. 13) which is attached to a back surface of a lower end of the display to vibrate the display and to generate the sound of the first frequency band; and a third actuator (e.g., the third actuator 445 of FIG. 13) which is attached to the second surface of the housing to vibrate the second surface of the housing and to generate a sound of a second frequency band.

According to an embodiment of the disclosure, the electronic device may further include: an audio processing circuitry (not shown) which is positioned inside the housing and is electrically connected with the first actuator, the second actuator, or the third actuator; and a processor (e.g., the processor 120 of FIG. 12A) which is positioned inside the housing and is electrically connected with the audio processing circuitry.

According to an embodiment of the disclosure, the electronic device may further include a partition member (e.g., the partition member 450 of FIG. 5C) which is positioned between the first actuator and the second actuator.

According to an embodiment of the disclosure, stiffness of the second surface may be lower than stiffness of the display.

According to an embodiment of the disclosure, the second frequency band may be lower than the first frequency band.

According to an embodiment of the disclosure, the first actuator, the second actuator, or the third actuator may be configured to implement a haptic function.

The electronic device according to various embodiments of the disclosure can implement a multi-channel speaker system without having a separate speaker hole for emitting a sound, and thus can enhance acoustic performance of the electronic device.

In addition, the electronic device according to various embodiments of the disclosure can implement a multi-channel speaker system without a speaker hole, unlike a related-art electronic device, and thus can guarantee differentiation from the related-art electronic device from a design perspective, and can also enhance waterproof performance.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
　a housing;
　a display which is attached to the housing to be seen from the outside;
　an actuator which is attached to a back surface of the display to vibrate the display and to generate a sound of a first frequency band;
　a hole which is formed on an inside of one side surface of the housing; and
　a speaker, which is positioned on a region adjacent to the hole, to generate a sound of a second frequency band different from the first frequency band to directly transmit to the inside of the hole via a slit formed inside the hole,
　wherein the actuator comprises:
　　a first actuator which is attached to a certain region of the back surface of the display to vibrate the display; and
　　a second actuator which is attached to a back surface of the display spaced apart from the first actuator by a designated distance to vibrate the display.

2. The electronic device of claim 1, further comprising a partition member which is positioned between the first actuator and the second actuator.

3. The electronic device of claim 1, wherein the first frequency band is higher than the second frequency band.

4. The electronic device of claim 3, further comprising a low pass filter configured to generate a sound of a low frequency band in the speaker.

5. The electronic device of claim 1, wherein the hole is one of a first connector hole configured to accommodate a connector for exchanging power or data with an external electronic device, or a second connector hole configured to accommodate a connector for exchanging an audio signal with an external electronic device.

6. The electronic device of claim 5, further comprising a slit which is formed inside the hole to emit a sound generated in the speaker to the outside of the electronic device.

7. The electronic device of claim 5, wherein the first connector hole has an inner space formed between an inside of the first connector hole and a connector when the first connector hole and the connector are electrically connected with each other.

8. The electronic device of claim 7, wherein, when the connector is electrically connected to the first connector hole, the electronic device is configured to emit a sound generated in the speaker to the outside of the electronic device through the inner space.

9. The electronic device of claim 1, further comprising:
　at least one connection member having one end attached to a back surface of the display,
　wherein the actuator is attached to another end of the at least one connection member.

10. The electronic device of claim 1, further comprising:
　audio processing circuitry which is positioned inside the housing and is electrically connected with the actuator or the speaker; and
　a processor which is positioned inside the housing and is electrically connected with the audio processing circuitry.

11. The electronic device of claim 10, wherein the processor is configured to operate only the actuator when the electronic device is operated in a hand-set mode.

12. An electronic device comprising:
　a housing comprising a first surface facing in a first direction, a second surface facing in a second direction opposite to the first direction, and a side surface extended along borders of the first surface and the second surface to form an inner space, the housing omits a speaker hole for emitting audio;

a display which is seen from the outside through the first surface of the housing;
a first actuator which is attached to a back surface of an upper end of the display to vibrate the display and to generate a sound of a first frequency band;
a second actuator which is attached to a back surface of a lower end of the display to vibrate the display and to generate the sound of the first frequency band; and
a third actuator which is attached to the second surface of the housing to vibrate the second surface of the housing and to generate a sound of a second frequency band.

13. The electronic device of claim 12, further comprising:
audio processing circuitry which is positioned inside the housing and is electrically connected with the first actuator, the second actuator, or the third actuator; and
a processor which is positioned inside the housing and is electrically connected with the audio processing circuitry.

14. The electronic device of claim 12, further comprising a partition member which is positioned between the first actuator and the second actuator.

15. The electronic device of claim 12, wherein a stiffness of the second surface is lower than a stiffness of the display.

16. The electronic device of claim 15, wherein the second frequency band is lower than the first frequency band.

17. The electronic device of claim 13, wherein the first actuator, the second actuator, or the third actuator is configured to implement a haptic function.

18. The electronic device of claim 13, wherein the first actuator, the second actuator, and the third actuator are configured to implement a 2.1 channel speaker system.

19. The electronic device of claim 12, wherein the display includes a support member to which the first actuator and the second actuator are attached.

* * * * *